(12) United States Patent
Murakami et al.

(10) Patent No.: US 9,544,521 B2
(45) Date of Patent: Jan. 10, 2017

(54) IMAGING DEVICE

(71) Applicant: Panasonic Intellectual Property Management Co., Ltd., Osaka (JP)

(72) Inventors: Masashi Murakami, Kyoto (JP); Kazuko Nishimura, Kyoto (JP); Yutaka Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/741,452

(22) Filed: Jun. 17, 2015

(65) Prior Publication Data

US 2016/0006966 A1 Jan. 7, 2016

(30) Foreign Application Priority Data

Jul. 7, 2014 (JP) ................. 2014-139740

(51) Int. Cl.
*H04N 5/357* (2011.01)
*H04N 5/374* (2011.01)
(Continued)

(52) U.S. Cl.
CPC ........... *H04N 5/378* (2013.01); *H04N 5/3575* (2013.01); *H04N 5/3745* (2013.01)

(58) Field of Classification Search
CPC .... H04N 5/3575; H04N 5/3745; H04N 5/378; H04N 5/361; H04N 5/363; H04N 5/3655; H04N 5/37452; H04L 27/14623; H04L 27/146
(Continued)

(56) References Cited

U.S. PATENT DOCUMENTS 8,975,569 B2 * 3/2015 Yamazaki ............. H04N 5/378
                                                       250/208.1
2003/0146369 A1 * 8/2003 Kokubun ......... H01L 27/14643
                                                       250/208.1
(Continued)

FOREIGN PATENT DOCUMENTS

JP   2000-092394   3/2000
JP   2011-023986   2/2011
(Continued)

*Primary Examiner* — Tuan Ho
*Assistant Examiner* — Marly Camargo
(74) *Attorney, Agent, or Firm* — McDermott Will & Emery LLP

(57) ABSTRACT

An imaging device comprising: a pixel array that includes pixels arranged in rows and columns, each of the pixels outputting a pixel signal; vertical signal lines each of which is provided for each of the columns; a reference-signal generator that generates a reset signal corresponding to a reset voltage of the pixels; a signal processor that outputs a differential signal corresponding to a difference between the pixel signal and the reset signal; a first switch that is connected between one of the vertical signal lines and the signal processor, the first switch switching between input and interruption of the pixel signal from each of the pixels to the signal processor; and a second switch that is connected between the reference-signal generator and the signal processor, the second switch switching between input and interruption of the reset signal from the reference-signal generator to the signal processor.

15 Claims, 17 Drawing Sheets

(51) Int. Cl.
*H04N 5/378* (2011.01)
*H01L 27/146* (2006.01)
*H04N 5/361* (2011.01)
*H04N 5/365* (2011.01)
*H04N 5/3745* (2011.01)

(58) Field of Classification Search
USPC ....... 348/308, 241, 243, 302, 294, 297, 248;
341/108, 155, 141, 128, 129; 250/208.1;
257/291–293, 239
See application file for complete search history.

(56) References Cited

U.S. PATENT DOCUMENTS

| | | | |
|---|---|---|---|
| 2007/0194962 A1* | 8/2007 | Asayama | H03M 1/1014 341/144 |
| 2010/0091160 A1* | 4/2010 | Murakami | H04N 5/378 348/301 |
| 2011/0013052 A1 | 1/2011 | Yanai | |
| 2011/0074994 A1* | 3/2011 | Wakabayashi | H03M 1/0658 348/302 |
| 2012/0286138 A1 | 11/2012 | Yamazaki | |

FOREIGN PATENT DOCUMENTS

| | | |
|---|---|---|
| JP | 2012-235297 | 11/2012 |
| JP | 2012-253740 | 12/2012 |
| WO | 2011/093225 | 8/2011 |

\* cited by examiner

IMAGING DEVICE

BACKGROUND

1. Technical Field

The present disclosure relates to an imaging device.

2. Description of the Related Art

In imaging devices having pixel array sections where pixel cells are arranged in rows and columns, signal processing called correlated double sampling (CDS) is performed. Specifically, a CDS pixel signal is generated as an output signal. The CDS pixel signal corresponds to a potential difference between two arbitrary different timings in a vertical signal line disposed corresponding to a pixel column. The potential difference is the difference between a reset potential at the time of a reset operation and a potential at the time of pixel signal output.

Japanese Patent No. 4116710 discloses an imaging device including a two-dimensional pixel array, a retaining unit that is disposed for each pixel column and retains an output of a noise suppression circuit, and an integration unit that integrates signals resulting from reading a signal from the retaining unit two or more time during a horizontal blanking period.

SUMMARY

In one general aspect, the techniques disclosed here feature an imaging device comprising: a pixel array that includes pixels arranged in rows and columns, each of the pixels outputting a pixel signal; vertical signal lines each of which is provided for each of the columns; a reference-signal generator that generates a reset signal corresponding to a reset voltage of the pixels; a signal processor that outputs a differential signal corresponding to a difference between the pixel signal and the reset signal; a first switch that is connected between one of the vertical signal lines and the signal processor, the first switch switching between input and interruption of the pixel signal from each of the pixels to the signal processor; and a second switch that is connected between the reference-signal generator and the signal processor, the second switch switching between input and interruption of the reset signal from the reference-signal generator to the signal processor.

It should be noted that general or specific embodiments may be implemented as an element, a device, a system, an integrated circuit, and a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
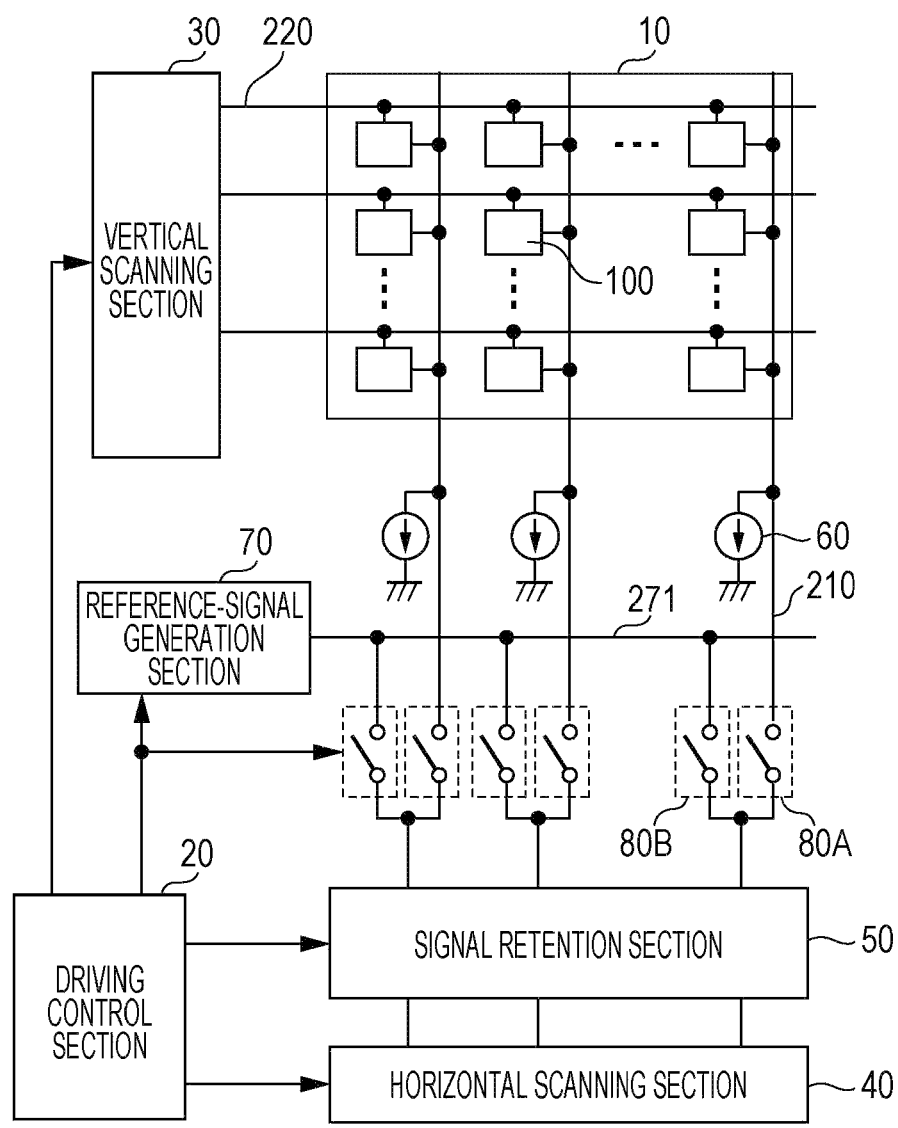
FIG. 1 is a block diagram illustrating an overall configuration of an imaging device according to a first embodiment.

In the imaging device disclosed in Japanese Patent No. 4116710, an integration circuit section resets a vertical signal line. This vertical signal line has a large capacity and therefore, charge and discharge at the time of reset takes a long time. Further, the integration circuit section is configured using an integrator having a switched capacitor, and even if an input voltage from a vertical signal line represents no (a dark) signal, an offset voltage that is the difference between the input voltage and a reference (ground) voltage is generated by a switching operation of the switched capacitor. Because of this switching operation with the offset voltage, a reading operation takes a long time.

In view of the above-described situation, a non-limiting and exemplary embodiment of the present disclosure provides an imaging device capable of high-speed reading.

An imaging device according to each of embodiments of the present disclosure will be described in detail below with reference to drawings. The embodiments to be described below each represent a specific example of the present disclosure. Therefore, numerical values, shapes, materials, components, arrangements as well as connection configurations of the components, and the like described in the following embodiments are each taken as an example, and not intended to limit the present disclosure. Accordingly, among the components in the following embodiments, any component not described in each independent claim representing a broadest concept of the present disclosure will be described as an arbitrary component.

In addition, each of the drawings is schematic, and is not necessarily an exact illustration. Moreover, in each of the drawings, the same components are provided with the same reference characters.

First Embodiment

First, an overall configuration of an imaging device according to a first embodiment will be described.

[1. Overall Configuration]

FIG. 1 is a block diagram showing an overall configuration of the imaging device according to the first embodiment. An imaging device 1 shown in FIG. 1 includes a pixel array section 10, a driving control section 20, a vertical scanning section 30, a horizontal scanning section 40, a signal retention section 50, a current source 60, a reference-signal generation section 70, a first switch section 80A, and a second switch section 80B. Further, in the pixel array section 10 and a peripheral region thereof, a vertical signal line 210 is disposed for each pixel column, and a scanning line 220 is disposed for each pixel row.

The pixel array section 10 is an imaging section in which pixels 100 are arranged in rows and columns.

The vertical scanning section 30 has a function of controlling a reset operation, an electric-charge accumulation operation, and a reading operation for the pixels 100, row by row.

The current source 60 is connected to the vertical signal line 210, and disposed corresponding to the vertical signal line 210. The current source 60 forms a source follower circuit, together with an amplification transistor of the pixel 100, and has a function of amplifying a voltage corresponding to electric charge stored in the pixel 100.

The signal retention section 50 retains a differential signal between a pixel signal outputted from the pixel 100 and a reset signal corresponding to this pixel 100, and outputs the differential signal in response to an instruction of the horizontal scanning section 40 to be described later.

The reference-signal generation section 70 generates a reset signal corresponding to the pixel 100.

The first switch section 80A is connected to the vertical signal line 210, and disposed corresponding to the vertical signal line 210. The first switch section 80A switches between input and interruption of a pixel signal from the pixel 100 to the signal retention section 50.

The second switch section 80B is connected to the reference-signal generation section 70, and disposed corresponding to the vertical signal line 210. The second switch section 80B switches between input and interruption of a reset signal from the reference-signal generation section 70 to the signal retention section 50.

The horizontal scanning section 40 has a function of sequentially selecting the above-described differential signal for one row retained in the signal retention section 50, and reading the selected differential signal to an output circuit (not shown) disposed on the output side of the signal retention section 50.

The driving control section 20 controls the vertical scanning section 30, the horizontal scanning section 40, the signal retention section 50, the reference-signal generation section 70, the first switch section 80A, and the second switch section 80B, by supplying various control signals to these sections. Specifically, for example, at first, the driving control section 20 brings the second switch section 80B to a conduction state, thereby allowing the signal retention section 50 to retain the above-described reset signal. Next, in the state where the above-described reset signal is retained by the signal retention section 50, the driving control section 20 brings the first switch section 80A to a conduction state, thereby allowing the signal retention section 50 to input a pixel signal via the vertical signal line 210. The signal retention section 50 thus retains a differential signal between a pixel signal outputted from the pixel 100 and a reset signal corresponding to this pixel 100.

[2. Configuration of Each Section]

Figure 2:
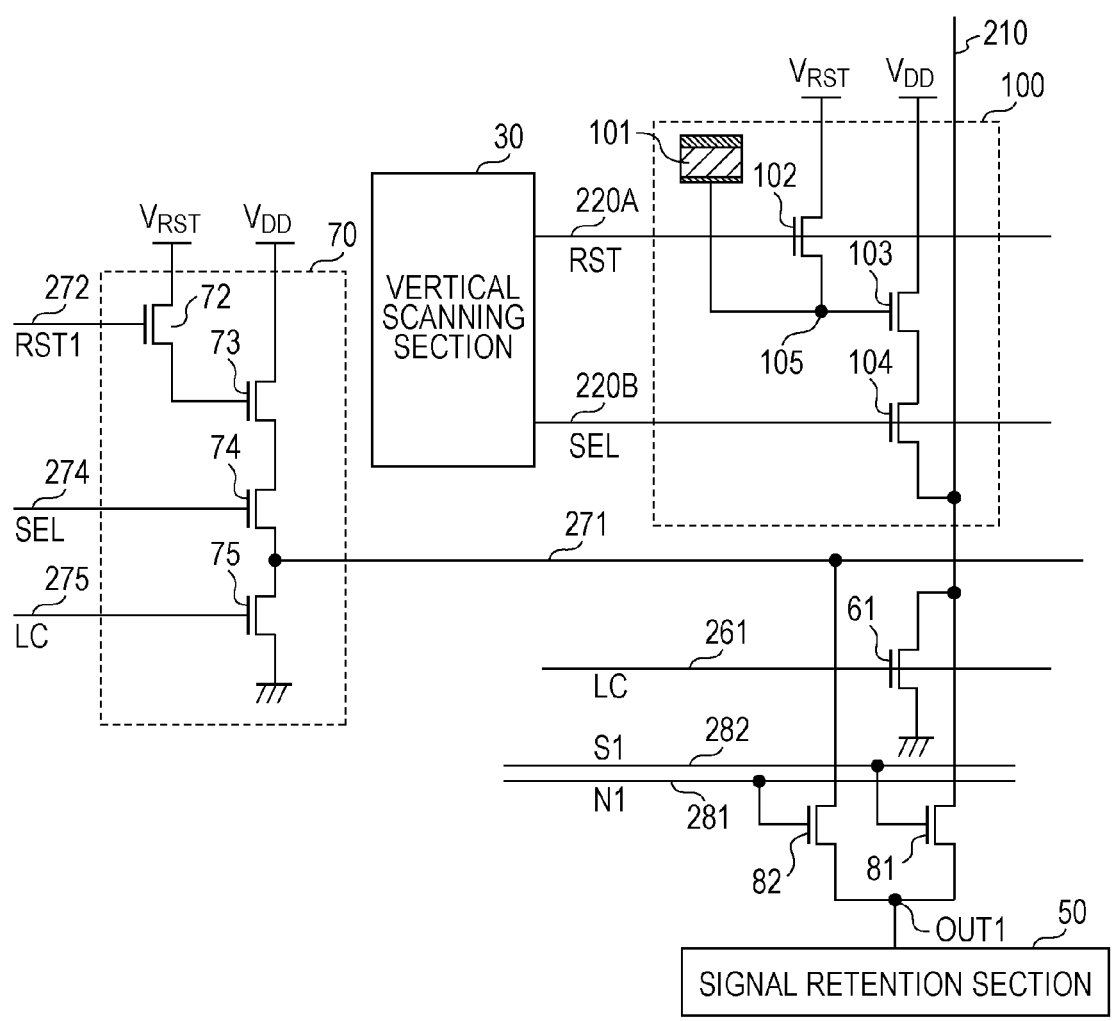
FIG. 2 is a diagram illustrating an example of a circuit configuration of each of a pixel and a reference-signal generation section according to the first embodiment.

FIG. 2 is a diagram showing an example of a circuit configuration of each of the pixel and the reference-signal generation section according to the first embodiment. FIG. 2 shows a specific circuit configuration example of each of the pixel 100, the reference-signal generation section 70, the current source 60, and each switch section.

[2-1. Pixel]

The pixel 100 includes a photoelectric conversion element 101, a reset transistor 102, an amplification transistor 103, a select transistor 104, and a charge storage section 105.

The photoelectric conversion element 101 is a photoelectric converter that performs a photoelectric conversion for converting incident light into signal charge. Specifically, the photoelectric conversion element 101 includes an upper electrode, a lower electrode, and a photoelectric conversion film interposed between these electrodes. The photoelectric conversion film contains, for example, organic molecules having a high light-absorbing ability. Further, the photoelectric conversion film has a thickness of, for example, about 500 nm. Furthermore, the photoelectric conversion film is formed using, for example, vacuum deposition. The light-absorbing ability of the above-described organic molecules is high over the entire range of visible light from a wavelength of about 400 nm to a wavelength of about 700 nm.

The photoelectric conversion element of the pixel 100 according to the present embodiment is not limited to the above-described configuration using the organic photoelectric conversion film, and may be, for example, a photodiode configured using an inorganic material.

The charge storage section 105 is connected to the photoelectric conversion element 101, and stores signal charge.

The amplification transistor 103 has a gate connected to the charge storage section 105, and a drain supplied with a power supply voltage $V_{DD}$, and outputs a pixel signal according to an amount of signal charge stored in the charge storage section 105.

The reset transistor 102 has a drain supplied with a reset voltage $V_{RST}$, and a sauce connected to the charge storage section 105, and resets the potential of the charge storage section 105.

The select transistor 104 has a drain connected to a sauce of the amplification transistor 103, and a sauce connected to the vertical signal line 210, and selectively outputs a pixel signal from the amplification transistor 103.

[2-2. Reference-Signal Generation Section]

The reference-signal generation section 70 includes transistors 72 to 75.

The transistor 73 is a first transistor having a drain supplied with a power supply voltage $V_{DD}$.

The transistor 74 is a second transistor having a drain connected to a sauce of the transistor 73, and a sauce connected to a switch transistor 82 of the second switch section 80B.

The transistor 72 is a third transistor having a drain supplied with a reset voltage $V_{RST}$, and a sauce connected to a gate of the transistor 73.

The transistor 75 is a current source transistor having a drain connected to the sauce of the transistor 74, and a source being grounded.

The above-described circuit configuration of the reference-signal generation section 70 is similar to a circuit configuration formed by combining the pixel 100 excluding the photoelectric conversion element 101, with a current source transistor 61.

[2-3. Current Source]

The current source transistor 61 has a drain connected to the vertical signal line 210, and a source being grounded, and forms the current source 60 shown in FIG. 1.

[2-4. Switch Section]

A switch transistor 81 is the first switch section 80A having a drain connected to the vertical signal line 210, and a sauce connected to the signal retention section 50.

The switch transistor 82 is the second switch section 80B having a drain connected to a reference signal line 271, and a sauce connected to the signal retention section 50.

The above-described configuration of the reference-signal generation section 70 allows signal processing at the time of a reset operation in correlated double sampling (CDS) processing. Specifically, a reset signal is outputted from the reference-signal generation section 70 to the signal retention section 50 via the reference signal line 271, instead of being outputted from the pixel 100 to the signal retention section 50 via the vertical signal line 210.

Therefore, it is possible to allow the signal retention section 50 to retain a reset signal corresponding to the reset signal of the pixel 100, without requiring the time to charge and discharge the vertical signal line 210 extending in a pixel-column direction and having a large capacity, by using the reset voltage $V_{RST}$.

Here, an electric characteristic of the transistor 73 may be substantially identical with an electric characteristic of the amplification transistor 103. For example, the difference between a threshold of the transistor 73 and a threshold of the amplification transistor 103 may be 200 mV or less.

Further, an electric characteristic of the transistor 74 may be substantially identical with an electric characteristic of the select transistor 104. For example, the difference between a threshold of the transistor 74 and a threshold of the select transistor 104 may be 200 mV or less.

Furthermore, an electric characteristic of the transistor 72 may be substantially identical with an electric characteristic of the reset transistor 102. For example, the difference between a threshold of the transistor 72 and a threshold of the reset transistor 102 may be 200 mV or less.

In addition, an electric characteristic of the transistor 75 may be substantially identical with an electric characteristic of the current source transistor 61. For example, the difference between a threshold of the transistor 75 and a threshold of the current source transistor 61 may be 200 mV or less.

Moreover, to drive the reference signal line 271, the reference-signal generation section 70 may be configured in two or more arrays, by providing a parallel connection of transistors, for example. This can reduce an output impedance of the reference-signal generation section 70, and therefore, driving capability can be increased, and a noise level can be lowered.

Therefore, the circuit configuration of the reference-signal generation section 70 and the circuit configuration of the pixel 100 excluding the photoelectric conversion element 101 can be substantially identical. In other words, the circuit configuration of the reference-signal generation section 70 is a replica of the source follower circuit in the pixel 100. Accordingly, a reset signal voltage outputted from the reference-signal generation section 70 can be substantially identical with a reset signal voltage outputted from the pixel 100 by turning on the reset transistor 102. Hence, it is possible to execute the CDS processing at the signal retention section 50, without resetting the potential of the charge storage section 105 of the pixel 100, and therefore, high-speed and high-accuracy nondestructive reading is achievable.

The reset operation performed by the reference-signal generation section 70 will be described in detail later, by using FIGS. 5 and 6.

[2-5. Modification of Reference-Signal Generation Section]

Figure 3:
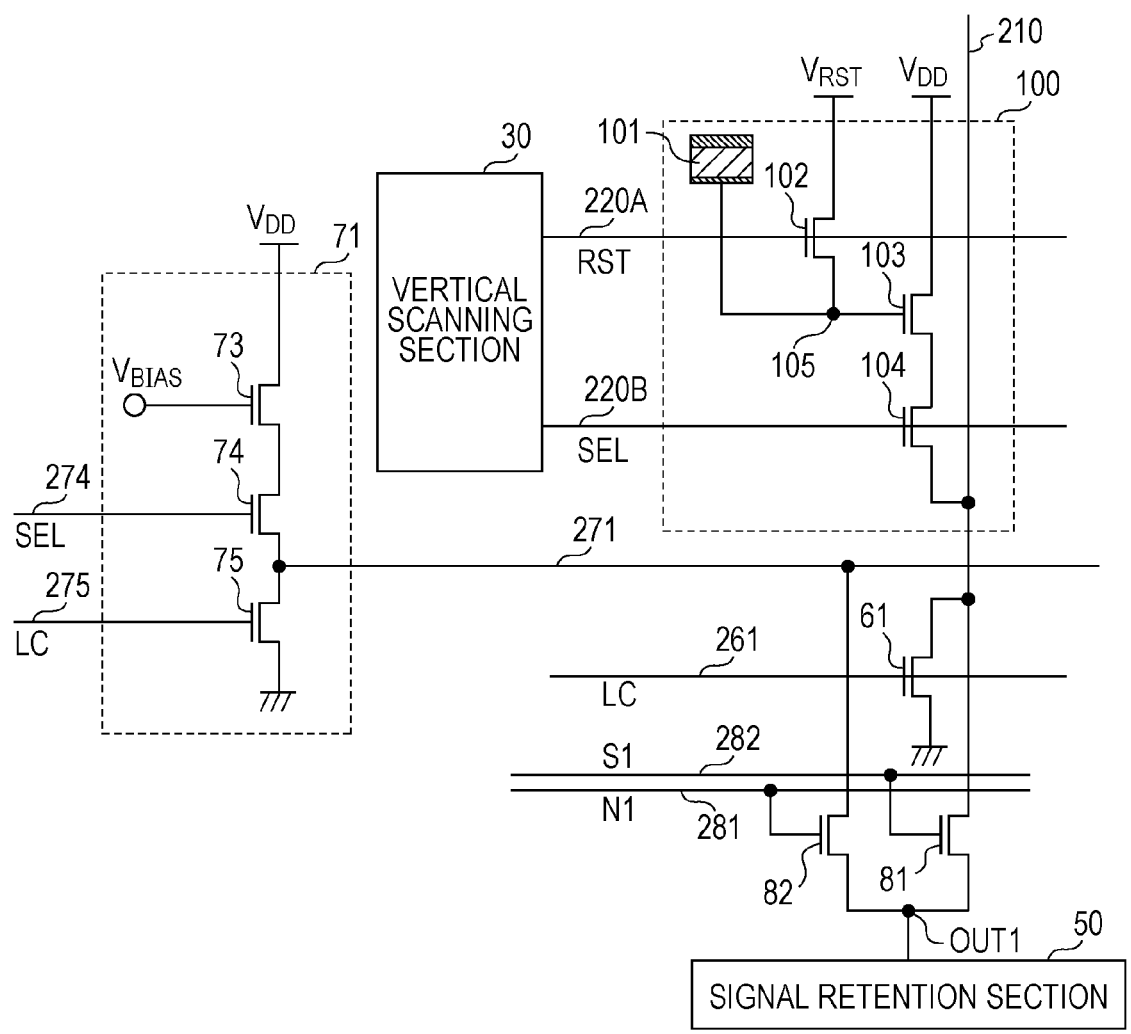
FIG. 3 is a diagram illustrating an example of a circuit configuration of each of a pixel and a reference-signal generation section according to a modification of the first embodiment.

FIG. 3 is a diagram showing an example of a circuit configuration of each of a pixel and a reference-signal generation section according to a modification of the first embodiment. Only the circuit configuration of the reference-signal generation section is different, as compared with the circuit configuration of each of the pixel and the reference-signal generation section shown in FIG. 2. Therefore, the point different from the circuit configuration shown in FIG. 2 will be mainly described below.

A reference-signal generation section 71 includes the transistors 73 to 75, but not the transistor 72 supplying the reset voltage $V_{RST}$ to the gate of the transistor 73. A bias voltage $V_{BIAS}$ is supplied to the gate of the transistor 73 from a bias-voltage supply line.

According to the configuration of the reference-signal generation section 71 in the present modification, the circuit configuration of the reference-signal generation section 71 and the circuit configuration of the pixel 100 excluding the photoelectric conversion element 101 can be substantially identical. Therefore, a reset signal voltage outputted from the reference-signal generation section 71 can be substantially identical with a reset signal voltage outputted from the pixel 100. Accordingly, it is possible to execute the CDS processing at the signal retention section 50 without resetting the potential of the charge storage section 105 of the pixel 100, and therefore, high-speed and high-accuracy nondestructive reading is achievable.

As compared with the reference-signal generation section 70, the reference-signal generation section 71 can supply a more stable reset signal, because a constant voltage is applied to the gate of the transistor 73. In contrast, in the reference-signal generation section 70, the transistor 72 corresponding to the reset transistor 102 is provided and therefore, when the reset transistor 102 is in an OFF state, the gate of the transistor 73 is in a floating state and susceptible to noise. However, when the reset transistor 102 is in the OFF state, a reset signal reflecting an offset by capacitive coupling can be reproduced, and in this respect, higher-accuracy CDS processing can be realized.

[2-6. Signal Retention Section]

Figure 4:
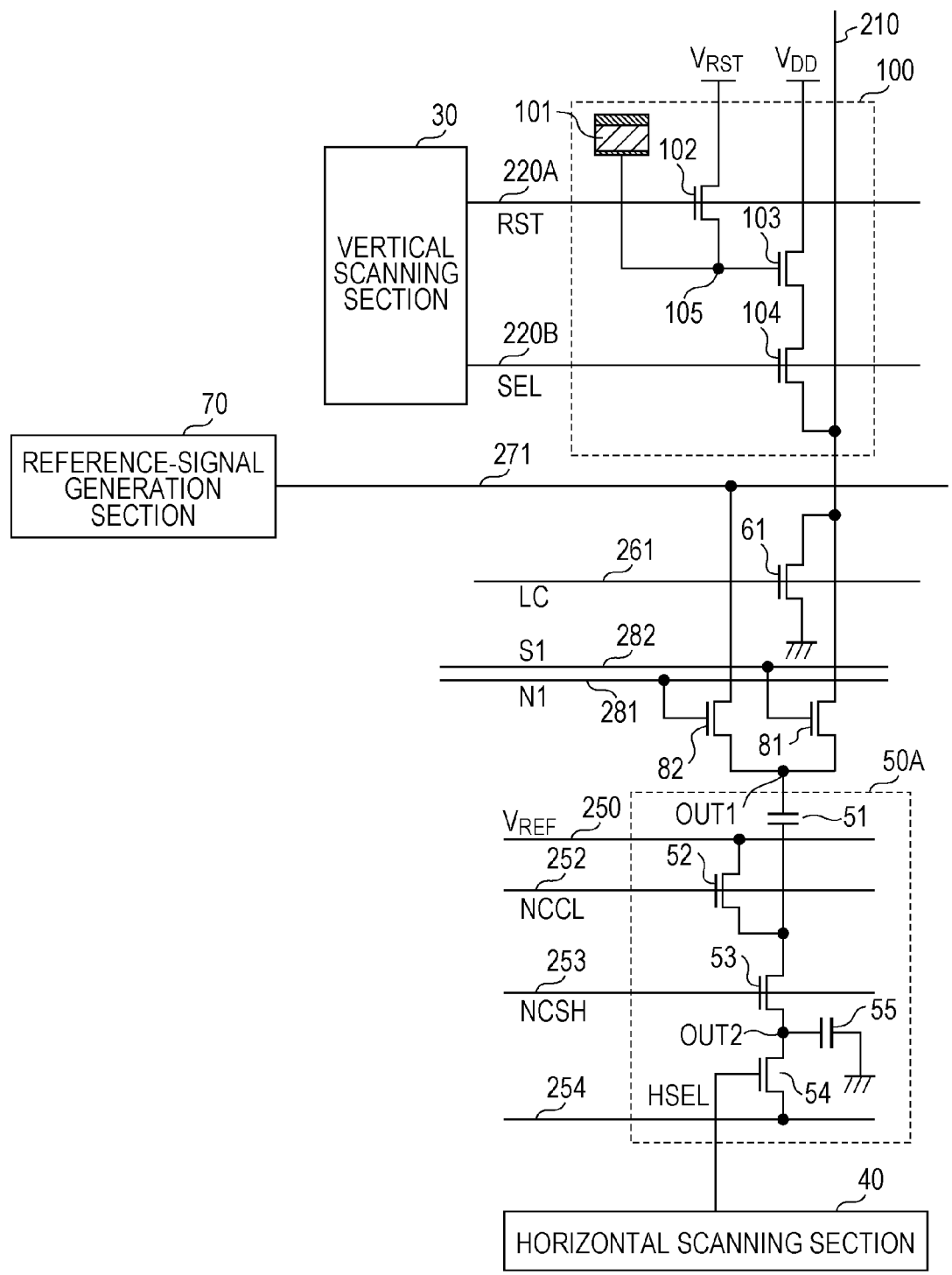
FIG. 4 is a diagram illustrating an example of a circuit configuration of a signal retention section and a peripheral part thereof according to the first embodiment.

FIG. 4 is a diagram showing an example of a circuit configuration of the signal retention section and a peripheral part thereof according to the first embodiment. A signal retention circuit 50A shown in FIG. 4 is disposed corresponding to the vertical signal line 210, and connected to the vertical signal line 210 via the switch transistor 81 as well as being connected to the reference signal line 271 via the switch transistor 82. The signal retention circuit 50A is provided as each of signal retention circuits 50A disposed corresponding to the respective vertical signal lines 210, and the signal retention circuits 50A form the signal retention section 50.

The signal retention circuit 50A includes an input capacitor 51, transistors 52 to 54, and a signal retention capacitor 55. The signal retention circuit 50A thus configured can cause the signal retention capacitor 55 to retain a pixel signal voltage outputted from the pixel 100 via the vertical signal line 210, and a reset signal voltage outputted from the reference-signal generation section 70 via the reference signal line 271. When the transistor 54 is brought to an ON state by the control of the horizontal scanning section 40, a CDS pixel signal, which is a differential voltage between the above-described pixel signal voltage and the above-described reset signal voltage, is sequentially transferred to a horizontal signal line 254 in a horizontal direction, and then outputted to the output circuit (not shown).

Details of a CDS operation by the signal retention circuit 50A will be described later, using FIG. 5.

[2-7. CDS Reading Operation]

Figure 5:
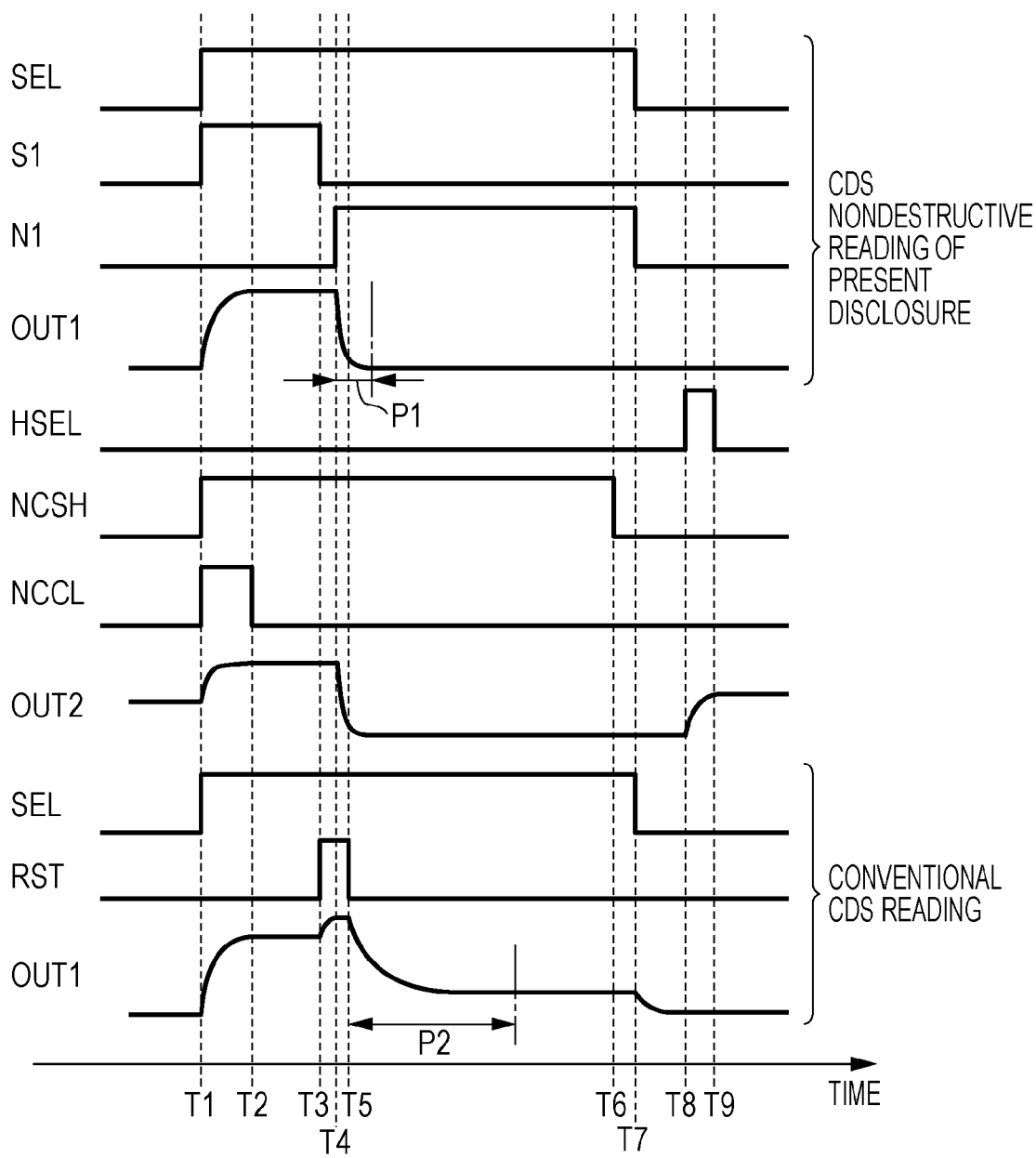
FIG. 5 is an operation timing chart for describing correlated double sampling (CDS) processing for a pixel signal in each of the imaging device according to the first embodiment and a conventional imaging device.

FIG. 5 is an operation timing chart for describing the CDS processing for a pixel signal in each of the imaging device according to the first embodiment and a conventional imaging device. FIG. 5 shows a voltage level of each of a control signal SEL for controlling a conduction state of the select transistor 104, a control signal S1 for controlling a conduction state of the switch transistor 81, a control signal N1 for controlling a conduction state of the switch transistor 82, an input terminal OUT1 of the signal retention circuit 50A, a control signal HSEL for controlling a conduction state of the transistor 54, a control signal NCSH for controlling a conduction state of the transistor 53, a control signal NCCL for controlling a conduction state of the transistor 52, a connection terminal OUT2 of the transistors 53 and 54 as well as the signal retention capacitor 55, a control signal SEL in a conventional method, a control signal RST in the conventional method, and an input terminal OUT1 in the conventional method, in this order from the top.

[2-7-1. Conventional CDS Reading Operation]

First, a reading operation (a destructive reading operation) in the conventional method will be described.

At a time T1, a vertical scanning section changes the control signal SEL to a high level, thereby bringing a select transistor 104 to an ON state. At the same time, control signals NCSH and NCCL are each changed to a high level, so that transistors 53 and 52 are each brought to an ON state. As a result, the potential of the input terminal OUT1 converges to a pixel signal voltage, and the potential of a connection terminal OUT2 is clamped (converges) to a reference voltage $V_{REF}$.

Next, at a time T2, the control signal NCCL is changed to a low level, so that the transistor 52 is brought to an OFF state. As a result, an input capacitor 51 retains the pixel signal voltage.

Next, at a time T3, the vertical scanning section changes the control signal RST to a high level, thereby bringing a reset transistor 102 to an ON state. As a result, the potential of a charge storage section 105 is reset by a reset voltage $V_{RST}$.

Next, at a time T5, the vertical scanning section changes the control signal RST to a low level, thereby bringing the reset transistor 102 to an OFF state. As a result, the reset voltage $V_{RST}$ of the charge storage section 105 is transmitted to the input terminal OUT1 via a vertical signal line 210, and the potential of the connection terminal OUT2 converges to a differential voltage that is a difference between a pixel signal voltage and a reset signal voltage. Here, in the reading operation in the conventional method, a period from the time when the charge storage section 105 is changed to have the reset voltage $V_{RST}$ until the potential of the input terminal OUT1 converges to the reset voltage $V_{RST}$ is a period P2. The period P2 depends on a time constant of the vertical signal line 210 transmitting the reset voltage $V_{RST}$.

Next, at a time T6, the control signal NCSH is changed to a low level, to bring the transistor 53 to an OFF state. As a result, a CDS pixel signal that is the above-described differential voltage is retained in the signal retention capacitor 55.

Next, at a time T8, a horizontal scanning section 40 changes a control signal HSEL to a high level, thereby bringing a transistor 54 to an ON state. As a result, the CDS pixel signal that is the above-described differential voltage is read out to a horizontal signal line 254.

[2-7-2. CDS Nondestructive Reading Operation]

Here, the reading operation (the nondestructive reading operation) according to the present embodiment will be described.

At a time T1, the vertical scanning section 30 changes the control signal SEL to a high level, thereby bringing the select transistor 104 to an ON state. At the same time, the control signals S1, NCSH, and NCCL are each changed to a high level, so that the switch transistor 81, the transistor 53, and the transistor 52 are each brought to an ON state. As a result, the potential of the input terminal OUT1 converges to a pixel signal voltage, and at the same time, the potential of the connection terminal OUT2 is clamped (converges) to a reference voltage $V_{REF}$.

Next, at a time T2, the control signal NCCL is changed to a low level, to bring the transistor 52 to an OFF state. As a result, the potential of the connection terminal OUT2 converges from the reference voltage $V_{REF}$ to the pixel signal voltage.

Next, at a time T3, the control signal S1 is changed to a low level, to bring the switch transistor 81 to an OFF state.

Next, at a time T4, the control signal N1 is changed to a high level, to bring the switch transistor 82 to an ON state. As a result, the reset voltage $V_{RST}$ outputted from the reference-signal generation section 70 is transmitted to the input terminal OUT1 via the reference signal line 271. Here, in the reading operation according to the present embodiment, a period from the time when the switch transistor 82 is brought to the ON state until the potential of the input terminal OUT1 converges to the reset voltage $V_{RST}$ is a period P1. The period P1 depends on a time constant of the reference signal line 271 transmitting the reset voltage $V_{RST}$.

Next, at a time T6, the control signal NCSH is changed to a low level, to bring the transistor 53 to an OFF state. As a result, the potential of the connection terminal OUT2 converges to a differential voltage that is a difference between a pixel signal voltage and a reset signal voltage.

Next, at a time T8, the horizontal scanning section 40 changes the control signal HSEL to a high level, thereby bringing the transistor 54 to an ON state. As a result, a CDS pixel signal that is the above-described differential voltage is read to the horizontal signal line 254.

In the CDS reading operation described above, a period until the potential of the input terminal OUT1 converges to the level of the reset signal voltage determines a CDS reading speed. In the conventional CDS reading operation, the period P2 depends on the time constant of the vertical signal line 210. In contrast, in the reading operation according to the present embodiment, the period P1 depends on the time constant of the reference signal line 271. The vertical signal lines 210 each extend along a pixel column within a pixel region, and are arranged corresponding to the number of pixel columns, and thus each have limited wiring thickness and width. In contrast, only at least one or more of the reference signal line 271 may be provided, and besides, an arrangement layout of the reference-signal generation section 70 has flexibility. For example, to drive the reference signal line 271, the reference-signal generation section 70 may be configured in two or more arrays, by providing a parallel connection of transistors, for example. This can reduce an output impedance of the reference-signal generation section 70, and therefore, driving capability can be increased, and a noise level can be lowered. Accordingly, the time constant of the reference signal line 271 can be set to be sufficiently smaller than the time constant of the vertical signal line 210.

In the reading operation according to the present embodiment, the pixel 100 may be reset.

Figure 6:
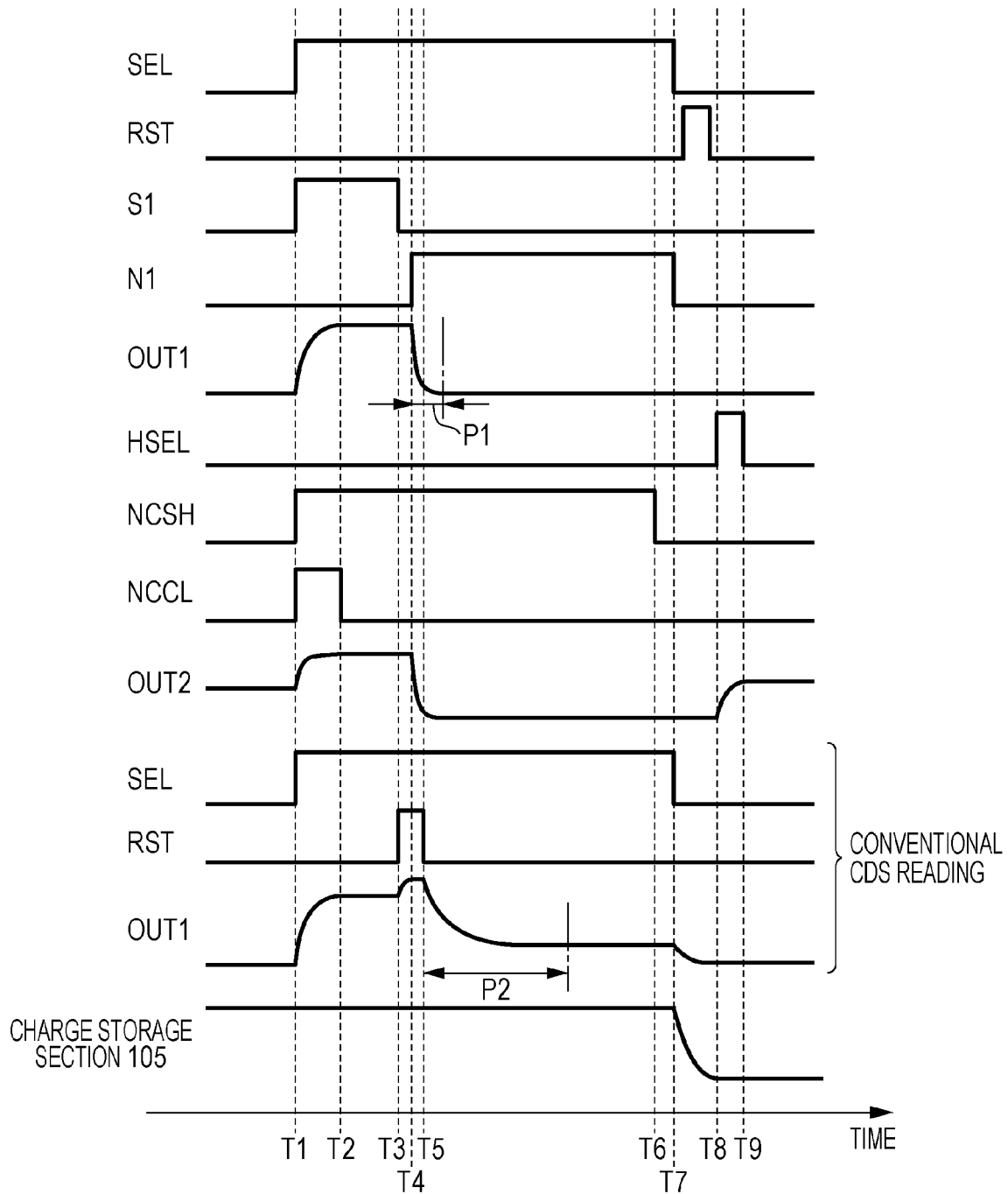
FIG. 6 is an operation timing chart for describing CDS processing for a pixel signal in each of an imaging device according to a modification of the first embodiment and a conventional imaging device.

FIG. 6 is an operation timing chart for describing CDS processing for a pixel signal in each of an imaging device according to a modification of the first embodiment and a conventional imaging device. The operation timing chart shown in FIG. 6 is different from the operation timing chart shown in FIG. 5, in that operation timing of a control signal RST for controlling a conduction state of the reset transistor 102, and a voltage of the charge storage section 105 are shown. Therefore, only the point different form the operation timing chart shown in FIG. 5 will be described below.

When it is desired to reset the pixel 100 after the above-described nondestructive reading operation, the control signal RST for the reset transistor 102 may be changed to a high level to bring the reset transistor 102 to an ON state, after the control signal NCSH is changed to the low level. Desirably, timing for changing the above-described control signal RST to the high level comes immediately after the control signal SEL is changed to the low level (in FIG. 6, timing between a time T7 and the time T8). The pixel 100 and the vertical signal line 210 are electrically disconnected by changing the control signal SEL to the low level. As a result, as shown in FIG. 6, the charge storage section 105 of the pixel 100 can be rapidly reset, without being affected by a load of the vertical signal line 210.

The reading operation according to the present modification is not executed when the nondestructive reading is to be continued.

As described above, according to the imaging device 1 of the present embodiment, the above-described period P1 can be shorter than the above-described period P2, and therefore, high-speed nondestructive CDS reading can be realized.

Further, in order for the signal retention section 50 to retain either one of a pixel signal voltage and a reset signal voltage by switching these signals, the imaging device 1 according to the present embodiment employs a simplified configuration. Specifically, the imaging device 1 employs a switch transistor switching between the vertical signal line 210 and the reference signal line 271, without employing a configuration such as an integrator having a switched capacitor. In addition, the circuit configuration of the pixel 100 and the circuit configuration of the reference-signal generation section 70 are substantially identical. Therefore, for example, an offset voltage is not generated in an operation of switching between a pixel signal and a reset signal. Accordingly, it is possible to realize high-speed high-precision CDS nondestructive reading without limiting the dynamic range of a pixel signal. In the present embodiment, the signal retention section 50 exemplifies the signal processor. It is the same in the following embodiments.

Second Embodiment

In a second embodiment, a reference-signal generation section has an arrangement layout to improve the speed and the reading accuracy of reading operation.

Figure 7:
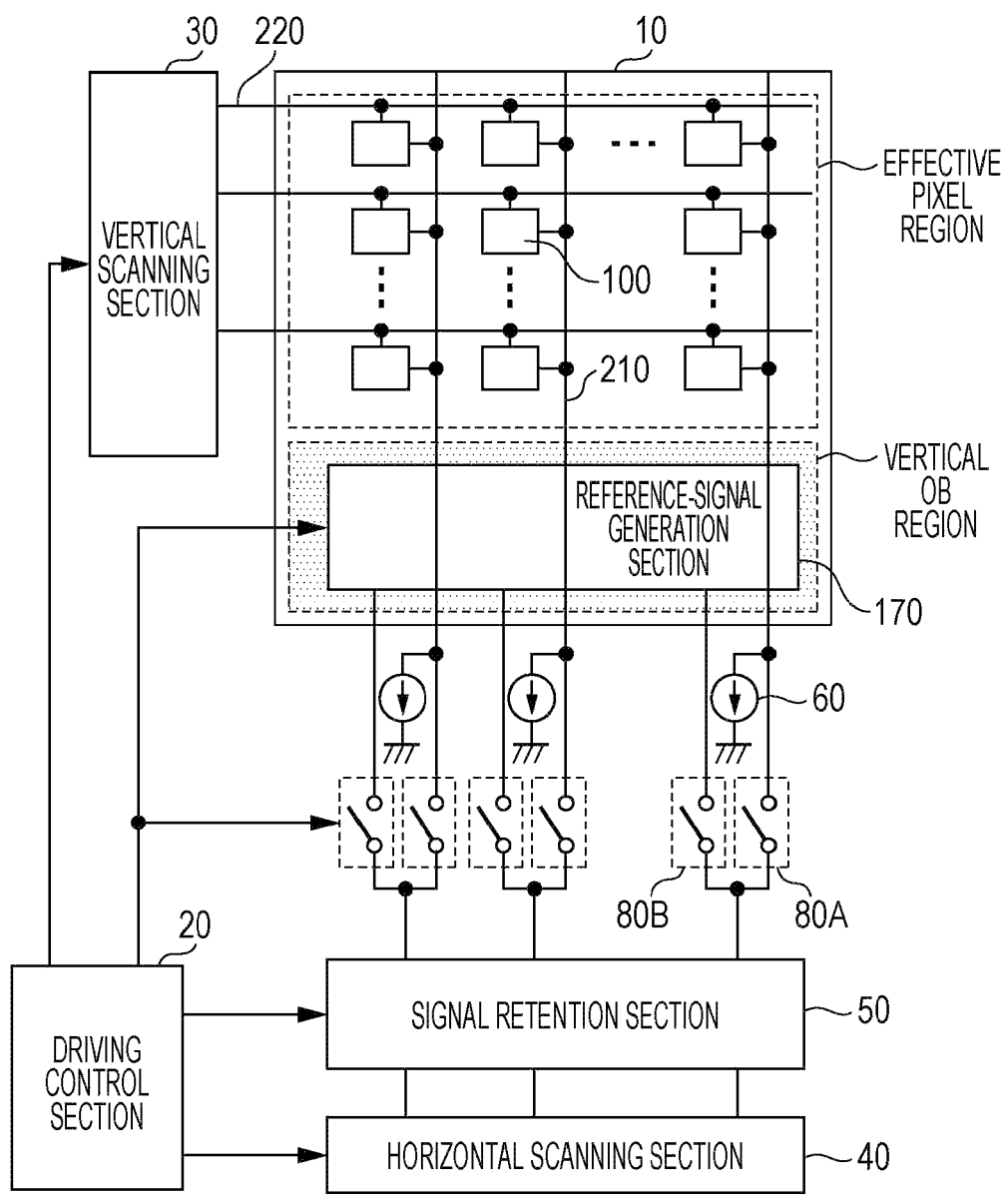
FIG. 7 is a block diagram illustrating an overall configuration of an imaging device according to a second embodiment.

FIG. 7 is a block diagram showing an overall configuration of an imaging device according to the second embodiment. An imaging device 2 shown in FIG. 7 includes a pixel array section 10, a driving control section 20, a vertical scanning section 30, a horizontal scanning section 40, a signal retention section 50, a current source 60, a reference-signal generation section 170, a first switch section 80A, and a second switch section 80B. Further, in the pixel array section 10 and a peripheral region thereof, a vertical signal line 210 is disposed for each pixel column, and a scanning line 220 is disposed for each pixel row.

In the imaging device 2, the reference-signal generation section 170 has an arrangement and a configuration different from those of the reference-signal generation section 70 in the imaging device 1 according to the first embodiment. Description of points similar to those of the imaging device 1 according to the first embodiment will be omitted, and the difference will be mainly described below.

The reference-signal generation section 170 generates a reset signal corresponding to a pixel 100.

The reference-signal generation section 170 is disposed in a so-called vertical optical black (OB) region. In the present embodiment, the current source 60 is not disposed in the vertical OB region. However, the current source 60 may be disposed in the vertical OB region. The vertical OB region is a first peripheral region located next to an effective pixel region, on either an upper side or a lower side (or both of these sides) of the effective pixel region in a column direction. The effective pixel region is a region formed of the pixels 100 that each output a pixel signal corresponding to each point of a two-dimensional image formed by image formation of light incident from a subject.

The vertical OB region is a region formed of light-shielding pixels each having a structure and a circuit configuration similar to those of the pixel 100, except blocking light. In the vertical OB region, the light-shielding pixels are arranged to be flush with the pixels 100, and each output a black level signal for determining the brightness level of a pixel signal, by performing control and reading similar to those for the pixel 100.

The reference-signal generation section 170 is disposed in the vertical OB region where the light-shielding pixels are disposed.

Figure 8:
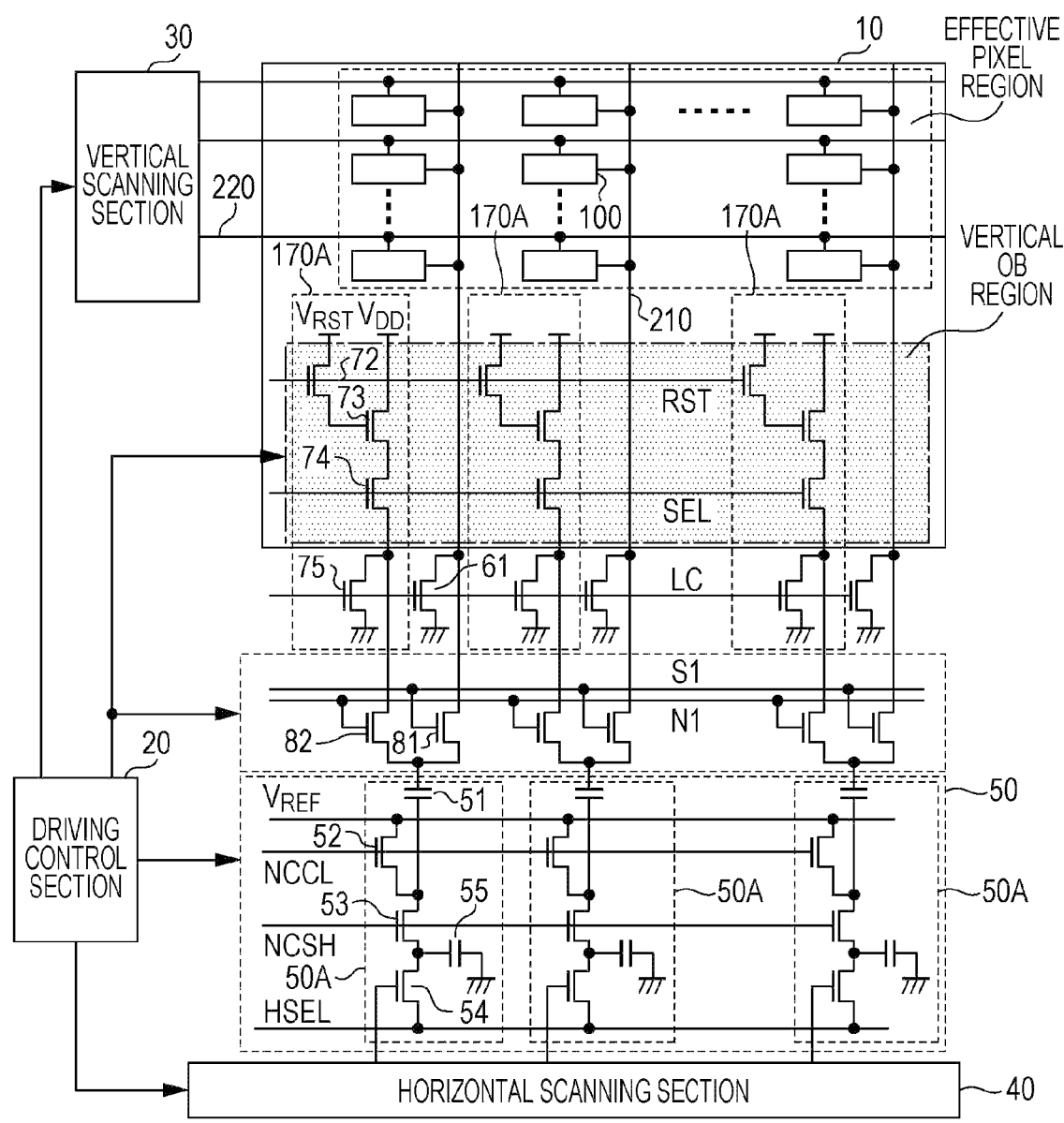
FIG. 8 is a diagram illustrating an example of a circuit configuration of the imaging device according to the second embodiment.

FIG. 8 is a diagram showing an example of a circuit configuration of the imaging device according to the second embodiment. FIG. 8 shows a specific circuit configuration corresponding to the overall configuration of the imaging device 2 shown in FIG. 7.

In the vertical OB region, reference-signal generation circuits 170A are arranged corresponding to each pixel column, and the reference-signal generation circuits 170A form the reference-signal generation section 170. The reference-signal generation circuit 170A is connected to a switch transistor 82 disposed for each pixel column. The reference-signal generation circuit 170A has a circuit configuration similar to the circuit configuration of the reference-signal generation section 70 according to the first embodiment, and a source terminal of a transistor 74 is connected to a drain terminal of the switch transistor 82. The circuit configuration of the reference-signal generation circuit 170A may be similar to the circuit configuration of the reference-signal generation section 71 according to the modification of the first embodiment.

Further, the signal retention section 50 includes signal retention circuits 50A disposed for each pixel column. The signal retention circuit 50A is connected to a connection point between the switch transistor 81 and a switch transistor 82 that are disposed for each pixel column.

In the above-described configuration, the reference-signal generation section 170 is disposed in the vertical OB region provided next to the effective pixel region. Therefore, the reference-signal generation circuit 170A and the pixel 100 can be closely similar to each other in terms of structure. Accordingly, a reset signal outputted from the reference-signal generation circuit 170A and a reset signal outputted from the pixel 100 can be matched with each other with high accuracy, so that higher-accuracy nondestructive CDS operation is realized.

In addition, since the reference-signal generation circuit 170A is disposed for each pixel column, a transistor 75 and a current source transistor 61 can be disposed in proximity to each other. Therefore, the reset signal is accurately supplied for each column. Moreover, a fluctuation in a ground voltage generated by a flow of an electric current from a current source transistor is independent of the position of a pixel column (e.g., a pixel center and a pixel edge, in a row (horizontal) direction), and therefore, the reset signal is accurately supplied for each column. Accordingly, a fluctuation of the reset signal outputted from the reference-signal generation section 170, the fluctuation being due to a factor independent of the pixel 100, can be suppressed. Therefore, a high-precision reset signal can be supplied to the signal retention section 50.

It is be noted that, since the reference-signal generation circuit 170A is disposed for each pixel column, power is expected to increase due to a flow of an electric current from a current source transistor of the reference-signal generation circuit 170A for each pixel column. To address this situation, for example, it is desirable to add a circuit configuration for causing a flow of an electric current from the current source transistor only when necessary such as when outputting a reset signal.

Further, to reduce power consumption, a shared current source may be provided for a current source necessary for output of a pixel signal and a current source necessary for output of a reset signal. In other words, in FIG. 8, the current source transistor 61 and the transistor 75 disposed for the same pixel column may be replaced with a shared current source transistor. Specifically, in place of the current source transistor 61 and the transistor 75, the shared current source transistor is provided, and a drain of the shared current source transistor is connected to a wiring that connects the connection point between the switch transistors 81 and 82 to an input terminal of the signal retention circuit 50A. This causes an electric current to flow exclusively from the current source transistor at the time of pixel signal output or at the time of reset signal output, thereby allowing a reduction in power consumption. Further, since the current source is common to the reference-signal generation circuit 170A and the pixel 100 being effective, it is possible to supply the same electric current, and a reset signal of the reference-signal generation circuit 170A can be matched with a reset signal of the pixel 100 with high accuracy. Furthermore, since the transistor 75 serving as a current source transistor is unnecessary, it is possible to reduce the area and the electric current of the reference-signal generation circuit 170A.

When the circuit configuration of the reference-signal generation circuit 170A and the circuit configuration of the reference-signal generation section 70 are similar, it is desirable to shield the reference-signal generation circuit 170A from light. This is to avoid a change in the conduction state of the transistor 72 serving as a reset transistor due to incident light.

In addition, the reset signal output from the reference-signal generation circuit 170A via the switch transistor 82 may be shared between the pixel columns. In this case, to output a reset signal from a single reference-signal generation circuit 170A to the pixel columns, the transistors of the reference-signal generation circuit 170A may be connected in parallel to each other. An array configuration achieved by such parallel connection can lower output impedance, and therefore, it is possible to increase the driving capability and to decrease the noise level. Moreover, since the transistor 75 and the current source transistor 61 are disposed in proximity to each other, it is possible to suppress (perform averaging of) an influence with respect to a fluctuation of a ground voltage due to a flow of an electric current from a current source transistor.

Third Embodiment

In a third embodiment, a reference-signal generation section has an arrangement layout to achieve a reduction of power consumption, in addition to improvements in the speed and the reading accuracy of reading operation.

Figure 9:
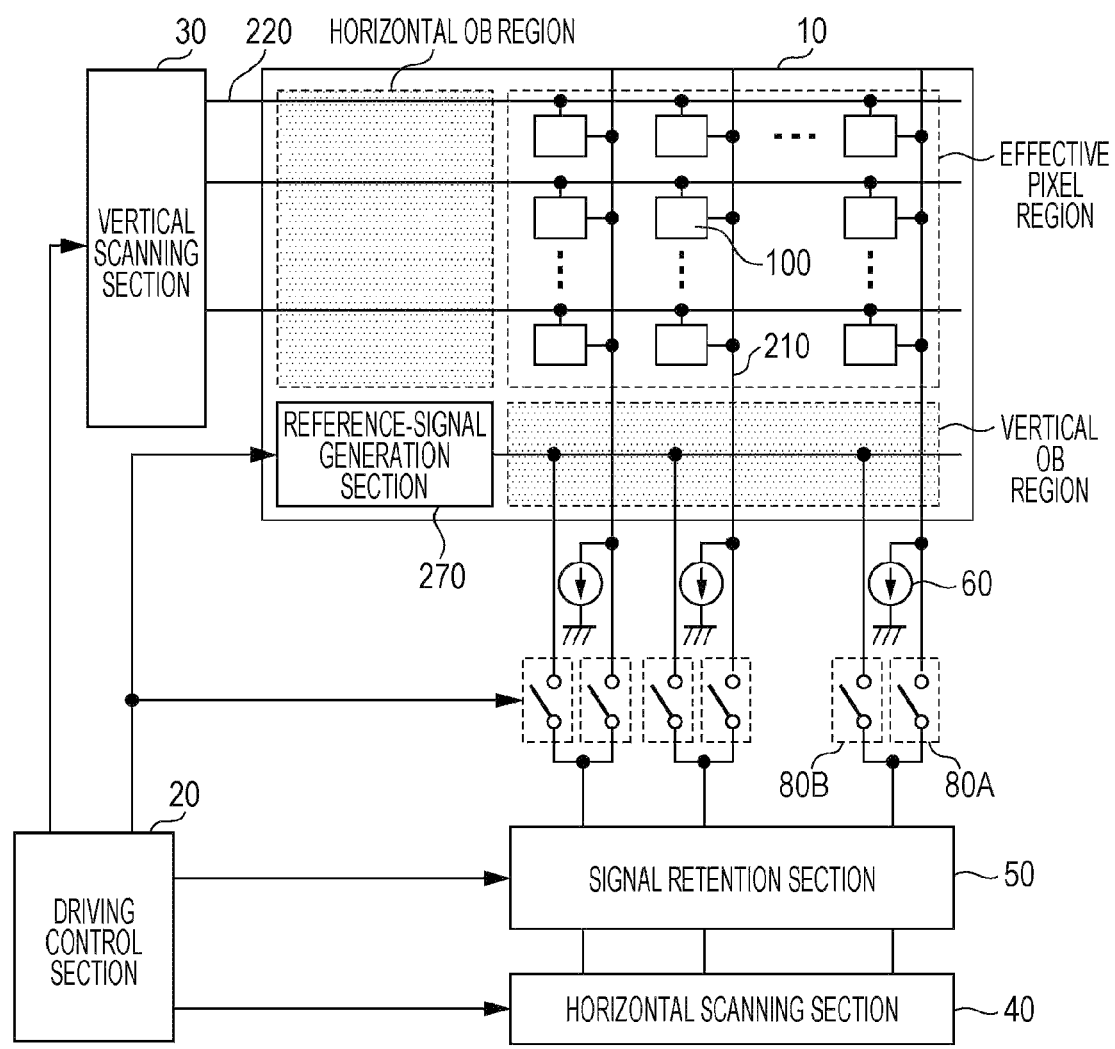
FIG. 9 is a block diagram illustrating an overall configuration of an imaging device according to a third embodiment.

FIG. 9 is a block diagram showing an overall configuration of an imaging device according to the third embodiment. An imaging device 3 shown in FIG. 9 includes a pixel array section 10, a driving control section 20, a vertical scanning section 30, a horizontal scanning section 40, a signal retention section 50, a current source 60, a reference-signal generation section 270, a first switch section 80A, and a second switch section 80B. Further, in the pixel array section 10 and a peripheral region thereof, a vertical signal line 210 is disposed for each pixel column, and a scanning line 220 is disposed for each pixel row.

In the imaging device 3, the reference-signal generation section 270 has an arrangement different from that of the reference-signal generation section 270 in the imaging device 1 according to the first embodiment. Description of points similar to those of the imaging device 1 according to the first embodiment will be omitted, and the difference will be mainly described below.

The reference-signal generation section 270 generates a reset signal corresponding to a pixel 100.

The reference-signal generation section 270 is disposed in a third peripheral region next to both of a vertical OB region and a horizontal OB region. The vertical OB region is a first peripheral region located next to an effective pixel region, on either an upper side or a lower side (or both of these sides) of the effective pixel region in a column direction. The horizontal OB region is a second peripheral region located next to the effective pixel region, on either a left side or a right side (or both of these sides) of the effective pixel region in a row direction. The effective pixel region is a region formed of the pixels 100 that each output a pixel signal corresponding to each point of a two-dimensional image formed by image formation of light incident from a subject.

The vertical OB region and the horizontal OB region each include light-shielding pixels that each have a structure and a circuit configuration similar to those of the pixel 100, except blocking light. In the vertical OB region and the horizontal OB region, the light-shielding pixels are arranged to be flush with the pixels 100, and each output a black level signal for determining the brightness level of a pixel signal, by performing control and reading similar to those for the pixel 100.

The current source 60 is disposed corresponding to a pixel column, and connected to the vertical signal line 210.

Figure 10:
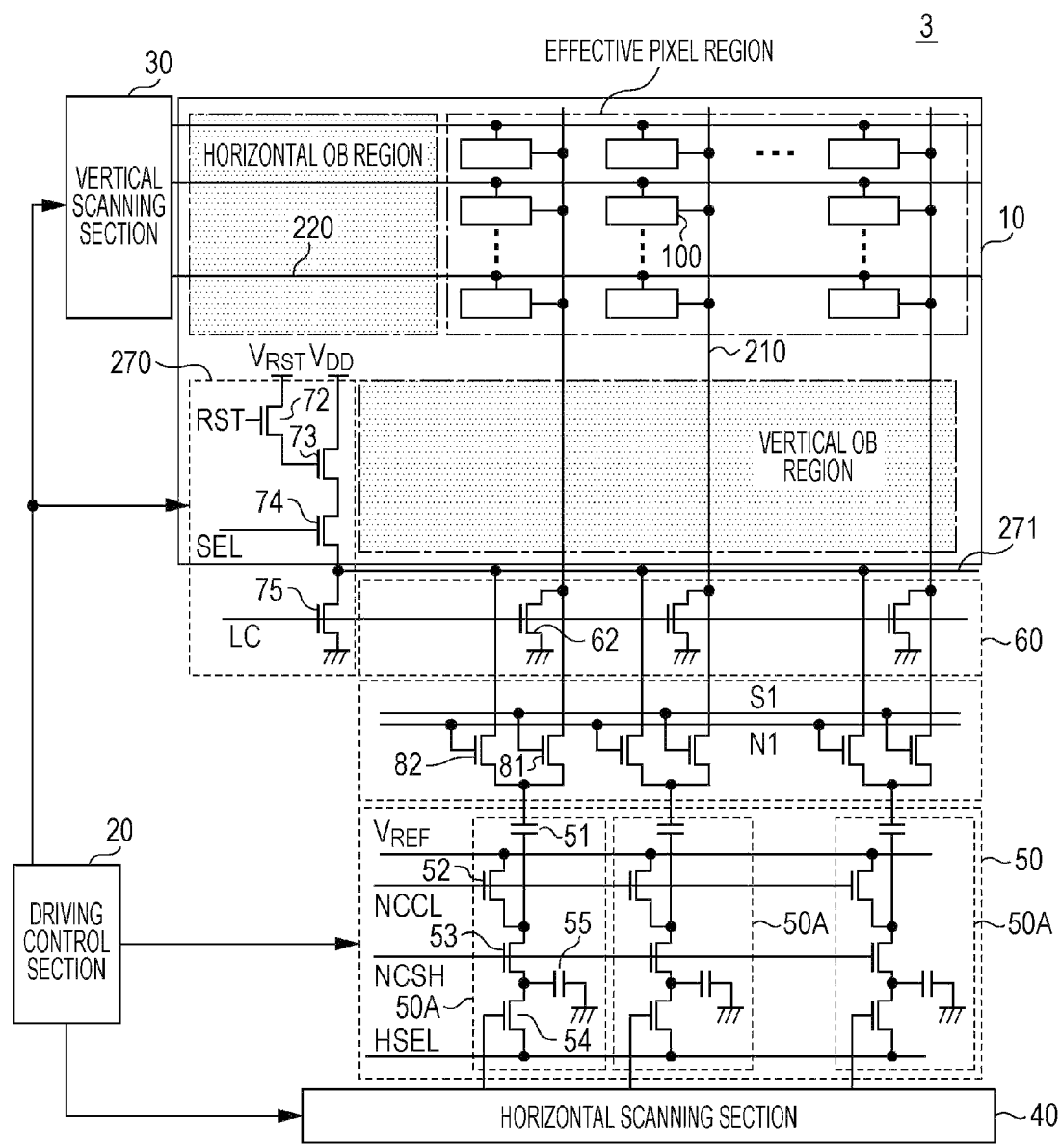
FIG. 10 is a diagram illustrating an example of a circuit configuration of the imaging device according to the third embodiment.

FIG. 10 is a diagram showing an example of a circuit configuration of the imaging device according to the third embodiment. FIG. 10 shows a specific circuit configuration corresponding to the overall configuration of the imaging device 3 shown in FIG. 9.

The reference-signal generation section 270 is disposed in the third peripheral region next to both of the vertical OB region and the horizontal OB region. The reference-signal generation section 270 includes transistors 72 to 75. A source terminal of the transistor 74 is connected to a switch transistor 82 disposed for each pixel column, via a reference signal line 271. The reference-signal generation section 270 is similar to the reference-signal generation section 70 according to the first embodiment.

A current source transistor 62 has a drain terminal connected to the vertical signal line 210. The current source transistor 62 serves as a current source in outputting a pixel signal of the pixel 100.

In the reference-signal generation section 270 shown in FIG. 10, one set of the transistors 72 to 75 is disposed. However, two or more reference-signal generation circuits each including the transistors 72 to 75 may be disposed according to the size of the third peripheral region, as well as according to the number of pixel columns. This makes it possible to reduce a load of the reference-signal generation section 270 with respect to a reset signal supplied to each pixel column, so that a stable reset signal can be outputted.

The reference-signal generation section 270 may have a circuit configuration similar to the circuit configuration of the reference-signal generation section 71 according to the modification of the first embodiment.

In the above-described configuration, the reference-signal generation section 270 is disposed in the third peripheral region next to the horizontal OB region and the vertical OB region. Therefore, the reference-signal generation section 270 and the pixel 100 can be closely similar to each other in terms of structure. Accordingly, a reset signal outputted from the reference-signal generation section 270 and a reset signal outputted from the pixel 100 can be matched with each other with high accuracy, so that higher-accuracy nondestructive CDS operation is realized. Further, the size of the vertical OB region can be reduced, because a reference-signal generation circuit for each pixel column is not provided. Furthermore, since the reference-signal generation section 270 is disposed in the third peripheral region close to the effective pixel region, the reference-signal generation section 270 and the pixel 100 can be closely similar to each other in terms of structure. Therefore, a reset signal outputted from the reference-signal generation section 270 and a reset signal outputted from the pixel 100 can be matched with each other with high accuracy, so that higher-accuracy nondestructive CDS operation is realized. Moreover, since a reference-signal generation circuit for each pixel column is not provided, an electric current can be controlled and adjusted at the reference-signal generation section 270, so that power can be reduced. For example, two or more reference-signal generation circuits each including the transistors 72 to 75 may be disposed, and an electric current may be adjusted based on the number of the disposed reference-signal generation circuits.

[Modification]

The number of reference-signal generation circuits to be disposed is limited by a limitation to the size of the third peripheral region. Therefore, a load fluctuation of the reference-signal generation section as well as a potential fluctuation of the reference signal line 271 are expected to become greater, as the size as well as the number of pixels become larger. An imaging device according to a modification to be described below is configured by adding a configuration of suppressing the potential fluctuation of the reference signal line 271 to the imaging device 3 according to the third embodiment.

Figure 11:
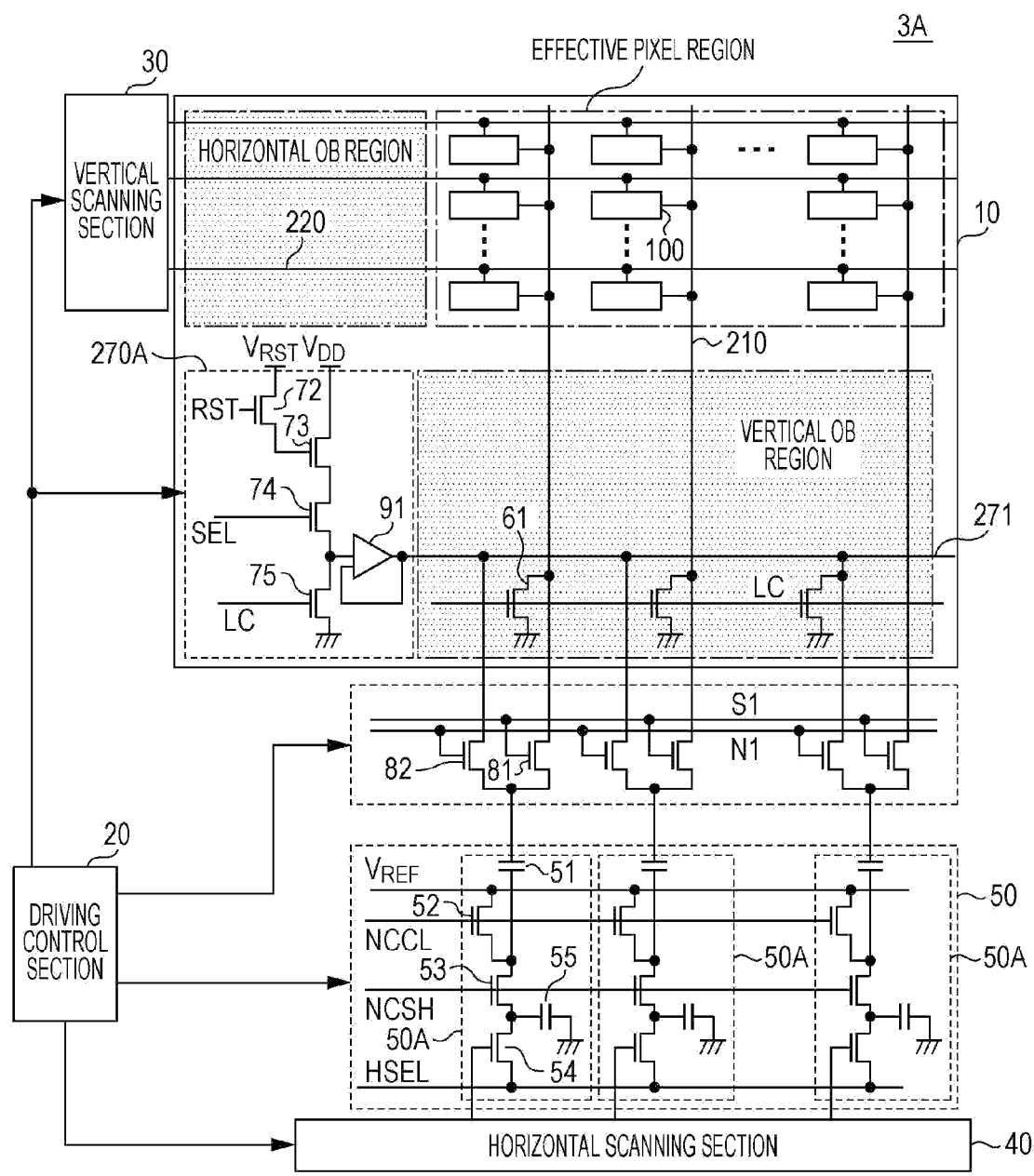
FIG. 11 is a diagram illustrating an example of a circuit configuration of an imaging device according to a modification of the third embodiment.

FIG. 11 is a diagram showing an example of a circuit configuration of the imaging device according to the modification of the third embodiment. An imaging device 3A shown in FIG. 11 includes a reference-signal generation section having a configuration different from that in the imaging device 3 according to the third embodiment. Description of points similar to those of the imaging device 3 according to the third embodiment will be omitted, and the difference will be mainly described below.

A reference-signal generation section 270A includes the transistors 72 to 75 and a buffer amplifier 91. A connection configuration of these transistors 72 to 75 is similar to a connection configuration of the transistors 72 to 75 in the reference-signal generation section 70. The buffer amplifier 91 forms a voltage-follower-type buffer circuit in which a negative input terminal and an output terminal are short-circuited.

A current source transistor 61 is disposed for each pixel column, and connected to the vertical signal line 210.

Therefore, a reset signal voltage on the input side of the buffer amplifier 91 is stably transmitted to the reference signal line 271 on the output side, even if there is a load fluctuation. Accordingly, the capability of driving a reset signal increases, even if the number of reference-signal generation circuits included in the reference-signal generation section 270A is small. Therefore, the signal retention section 50 can be supplied with a high-accuracy reset signal unaffected by a load fluctuation.

In the present modification, the voltage-follower-type buffer circuit in which the negative input terminal and the output terminal are short-circuited is taken as a circuit configuration that increases the capability of driving the reset signal. However, the circuit configuration that increases the capability of driving the reset signal is not limited to this type. Any type of circuit configuration may be adopted if an output impedance of a circuit is reduced and an output voltage follows an input voltage of this circuit.

Fourth Embodiment

In each of the first to third embodiments, the nondestructive CDS reading is implemented by outputting a reset signal generated in the reference-signal generation section to the signal retention section 50, in place of a reset signal outputted from the pixel 100 to the signal retention section 50 via the vertical signal line 210. In contrast, in a fourth embodiment, a vertical signal line is reset with a reference voltage, and a pixel signal is outputted to a signal retention section 50 via this vertical signal line. Nondestructive CDS reading is thereby implemented.

Figure 12:
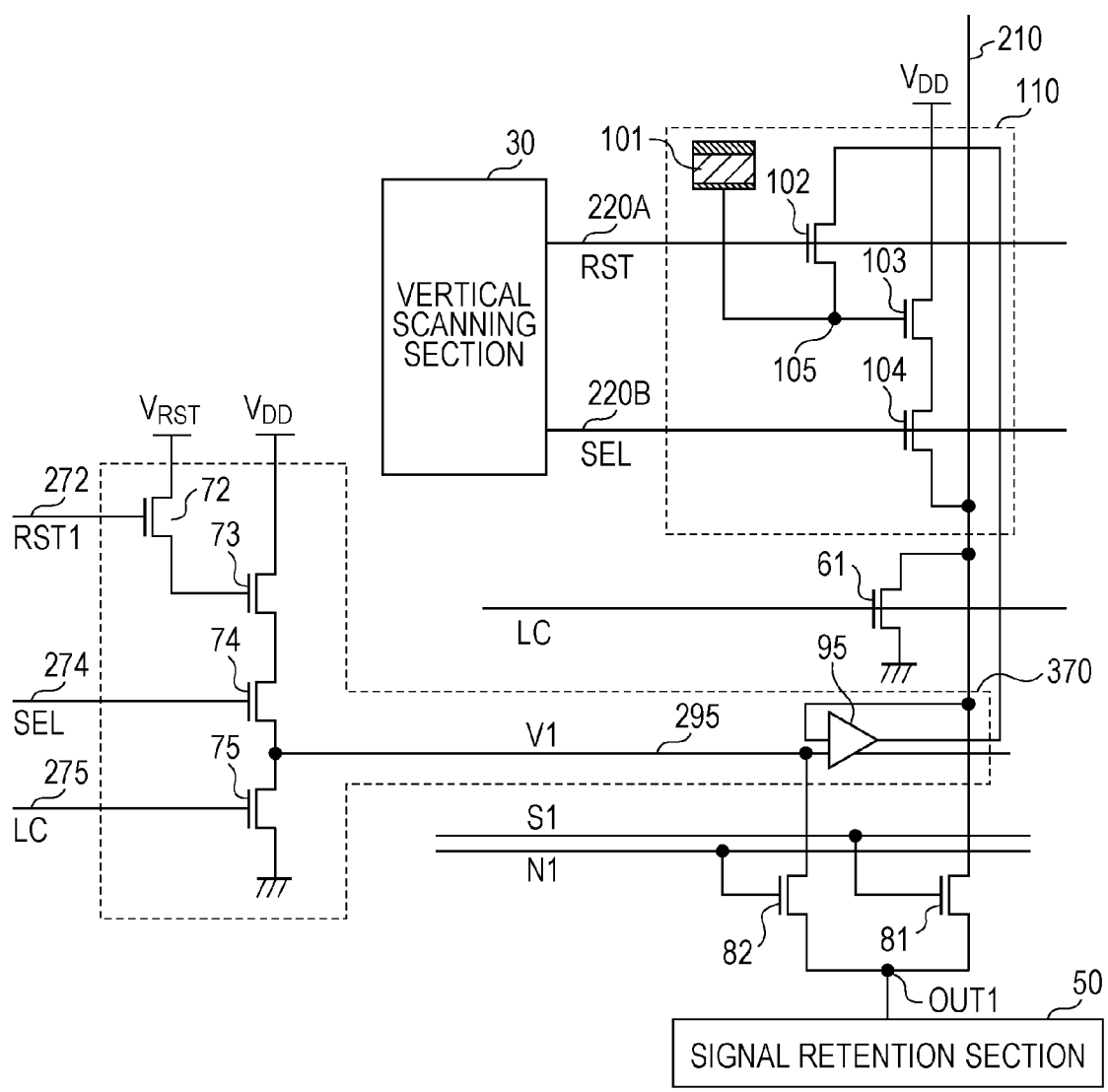
FIG. 12 is a diagram illustrating an example of a circuit configuration of each of a pixel and a reference-signal generation section according to a fourth embodiment.

FIG. 12 is a diagram showing an example of a circuit configuration of each of a pixel and a reference-signal generation section according to the fourth embodiment. FIG. 12 shows a pixel 110, a current source transistor 61, a reference-signal generation section 370, switch transistors 81 and 82, a vertical scanning section 30, and the signal retention section 50. The imaging device according to the present embodiment includes a driving control section 20 and a horizontal scanning section 40 similar to those of the first to third embodiments, in addition to the components shown in FIG. 12.

The circuit configuration of the pixel 110 is different from that of the pixel 100, only in that a drain of a reset transistor 102 is not connected to a reset power supply, while being connected to the reference-signal generation section 370.

The reference-signal generation section 370 includes an inverting amplifier 95, in addition to each component of the reference-signal generation section 70 according to the first embodiment. The inverting amplifier 95 is a buffer amplifier. In the inverting amplifier 95, a positive input terminal that is a second input terminal is connected to a reference signal line 295 supplying a reset voltage V1, a negative input terminal that is a first input terminal is connected to a vertical signal line 210, and an output terminal is connected to a drain terminal of the reset transistor 102.

The switch transistor 81 has a drain connected to the vertical signal line 210, a sauce connected to the signal retention section 50, and a gate serving as a first switch section connected to a control line for supplying a control signal S1.

The switch transistor 82 has a drain connected to the reference signal line 295, a sauce connected to the signal retention section 50, and a gate serving as a second switch section connected to a control line for supplying a control signal N1.

Here, CDS nondestructive reading operation in the above-described configuration will be described.

Figure 13:
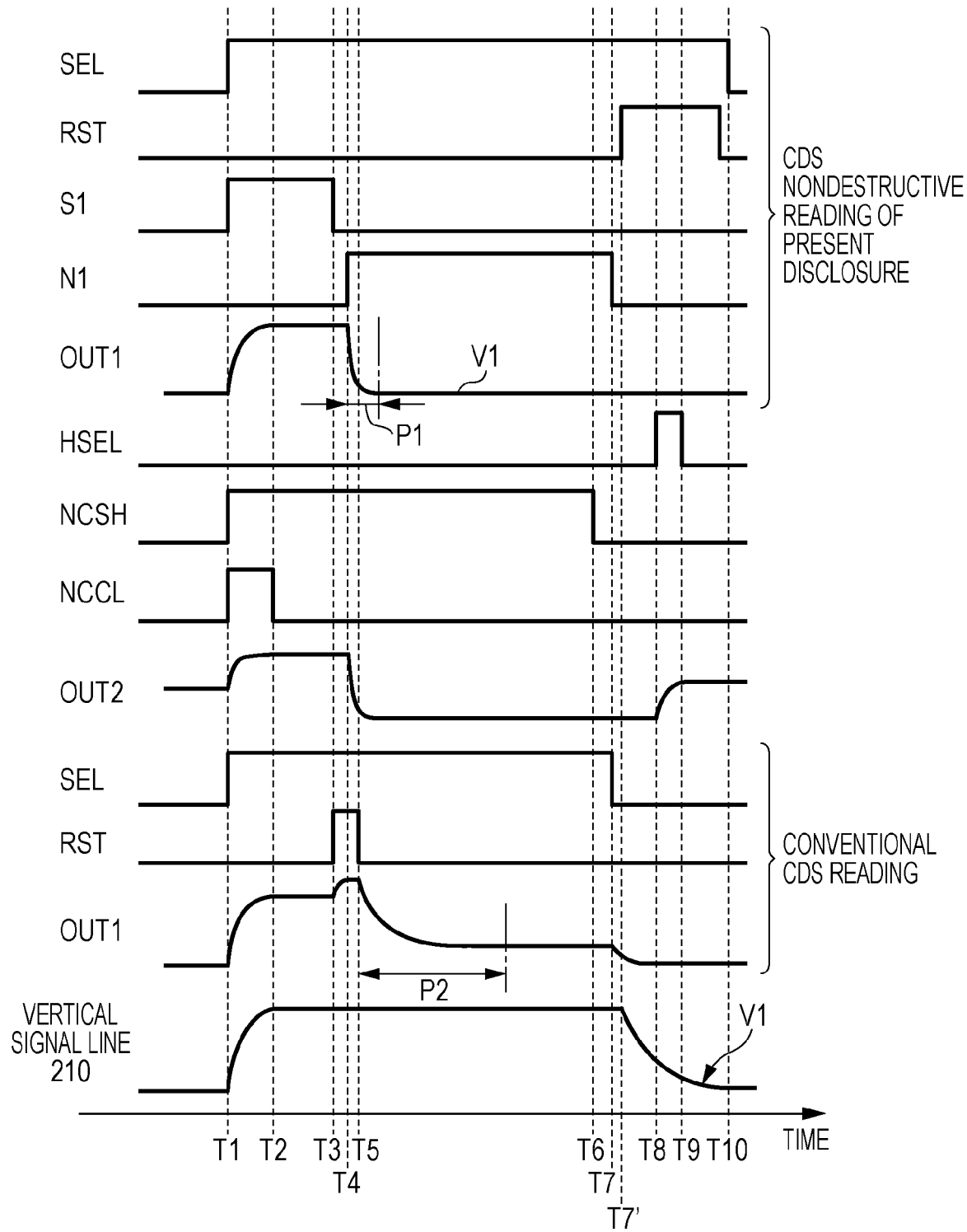
FIG. 13 is an operation timing chart for describing CDS processing for a pixel signal in each of the imaging device according to the fourth embodiment and a conventional imaging device.

FIG. 13 is an operation timing chart for describing CDS processing for a pixel signal in each of the imaging device according to the fourth embodiment and a conventional imaging device. The CDS nondestructive reading operation according to the present embodiment will be described below with reference to FIG. 13.

First, at a time T1, the vertical scanning section 30 changes a control signal SEL to a high level, thereby bringing a select transistor 104 to an ON state. At the same time, the control signal S1 as well as control signals NCSH and NCCL (shown in FIG. 4) supplied to the signal retention section 50 are each changed to a high level, so that the switch transistor 81 as well as transistors 53 and 52 (shown in FIG. 4) of the signal retention section 50 are each brought to an ON state. As a result, the potential of an input terminal OUT1 converges to a pixel signal voltage, and at the same time, the potential of a connection terminal OUT2 (shown in FIG. 4) is clamped (converges) to a reference voltage $V_{REF}$ (shown in FIG. 4).

Next, at a time T2, the control signal NCCL is changed to a low level, to bring the transistor 52 to an OFF state. As a result, the potential of the connection terminal OUT2 converges from the reference voltage $V_{REF}$ to the pixel signal voltage.

Next, at a time T3, the control signal S1 is changed to a low level, to bring the switch transistor 81 to an OFF state.

Next, at a time T4, the control signal N1 is changed to a high level, to bring the switch transistor 82 to an ON state. As a result, the reset voltage V1 outputted from the reference-signal generation section 370 is transmitted to the input terminal OUT1 via the reference signal line 295. Here, in the reading operation according to the present embodiment, a period from the time when the switch transistor 82 is brought to the ON state until the potential of the input terminal OUT1 converges to the reset voltage V1 is a period P1. The period P1 depends on a time constant of the reference signal line 295 that transmits the reset voltage V1.

Accordingly, it is possible to execute the CDS processing at the signal retention section 50 without resetting the potential of a charge storage section 105 of the pixel 110, and therefore, high-speed and high-accuracy nondestructive reading is achievable.

Next, at a time T6, the control signal NCSH is changed to a low level, to bring the transistor 53 to an OFF state. As a result, the potential of the connection terminal OUT2 converges to a differential voltage that is a difference between a pixel signal voltage and a reset signal voltage.

Next, at a time T8, the horizontal scanning section 40 changes a control signal HSEL to a high level, thereby bringing a transistor 54 to an ON state. As a result, a CDS pixel signal that is the above-described differential voltage is read out to a horizontal signal line 254.

Here, there will be described operation of setting the vertical signal line 210 at the reset signal V1 of the reference-signal generation section 370, in resetting the pixel 110. At a time T7' following a time T7, a control signal RST is changed to a high level, to bring the reset transistor 102 to an ON state. At this moment, the voltage of the negative input terminal connected to the vertical signal line 210 converges to the reset voltage V1 of the positive input terminal connected to the reference signal line 295, due to action of the inverting amplifier 95.

As a result, it is possible to set the vertical signal line 210 at the reset signal V1 of the reference-signal generation section 370, in resetting the pixel 110. In the present embodiment, due to the action of the inverting amplifier 95, the voltage of the negative input terminal connected to the vertical signal line 210 can accurately converge to a voltage equivalent to the reset voltage V1 of the positive input terminal connected to the reference signal line 295, without depending on variations in the transistors of the pixel section and variations in the current sources. In other words, when an input voltage from the vertical signal line represents no (a dark) signal, there is no difference from a reference voltage V1, and therefore, it is possible to provide an imaging device capable of performing high-speed nondestructive reading, without impairing a dynamic range.

Moreover, in resetting the pixel 110, although a period P2 is necessary for resetting a pixel, it is possible to perform driving without losing a high speed (a frame rate), by, for example, causing operation in the same period as a horizontal transfer period.

Fifth Embodiment

In each of the first to third embodiments, the nondestructive CDS reading is implemented by outputting a reset signal generated in the reference-signal generation section to the signal retention section 50, in place of a reset signal outputted from the pixel 100 to the signal retention section 50 via the vertical signal line 210. In contrast, in a fifth embodiment, a vertical signal line is reset with a reference voltage, and a pixel signal is outputted to a signal retention section 50 via this vertical signal line. Nondestructive CDS reading is thereby implemented.

Figure 14:
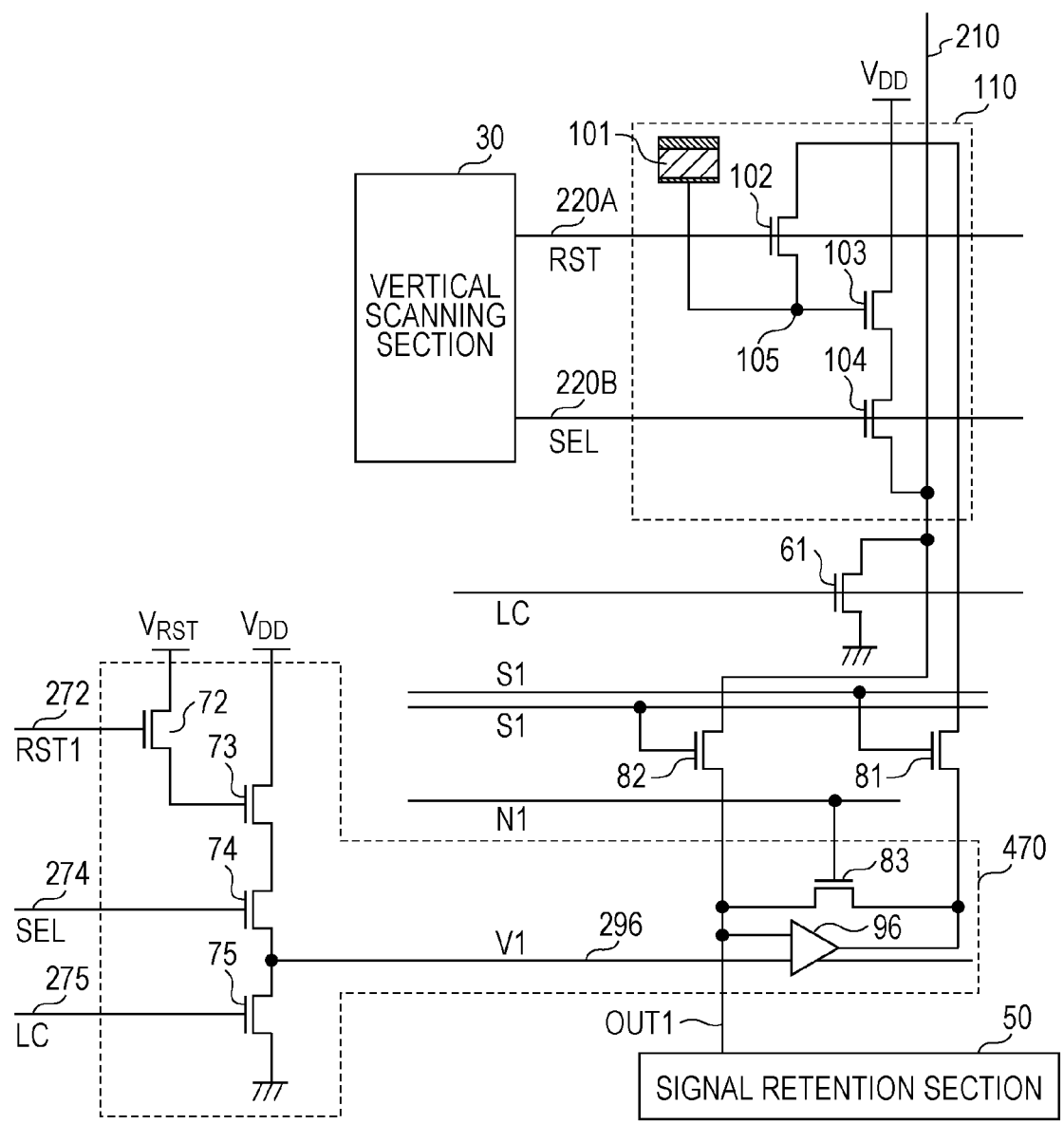
FIG. 14 is a diagram illustrating an example of a circuit configuration of each of a pixel and a reference-signal generation section according to a fifth embodiment.

FIG. 14 is a diagram showing an example of a circuit configuration of each of a pixel and a reference-signal generation section according to the fifth embodiment. FIG. 14 shows a pixel 110, a current source transistor 61, a reference-signal generation section 470, switch transistors 81 and 82, a vertical scanning section 30, and the signal retention section 50. The imaging device according to the present embodiment includes a driving control section 20 and a horizontal scanning section 40 similar to those of the first to third embodiments, in addition to the components shown in FIG. 14.

The circuit configuration of the pixel 110 is different from that of the pixel 100, only in that a drain of a reset transistor 102 is not connected to a reset power supply, while being connected to the reference-signal generation section 470 via the switch transistor 81.

The reference-signal generation section 470 includes an inverting amplifier 96, in addition to each component of the reference-signal generation section 70 according to the first embodiment. The inverting amplifier 96 is a buffer amplifier. In the inverting amplifier 96, a positive input terminal serving as a second input terminal is connected to a reference signal line 296 that supplies a reset voltage V1, a negative input terminal serving as a first input terminal is connected to a vertical signal line 210 via the switch transistor 82, and an output terminal is connected to a drain of the reset transistor 102 via the switch transistor 81. Further, the negative input terminal and the output terminal of the inverting amplifier 96 are connected to each other via a switch transistor 83.

The switch transistor 81 is a first switch transistor having a drain connected to the drain of the reset transistor 102, a sauce connected to the output terminal of the inverting amplifier 96, and a gate connected to a control line that supplies a control signal S1.

The switch transistor 82 is a second switch transistor having a drain connected to the vertical signal line 210, a sauce connected the negative input terminal of the inverting amplifier 96 and one end of the switch transistor 83, and a gate connected to a control line that supplies a control signal S1.

The switch transistors 81 and 82 form a first switch section.

The switch transistor 83 is a second switch section in which one of a source and a drain is connected to the negative input terminal of the inverting amplifier 96 and the sauce of the switch transistor 82, and the other of the source and the drain is connected to the output terminal of the inverting amplifier 96 and the source of the switch transistor 81.

Here, CDS nondestructive reading operation in the above-described configuration will be described.

Figure 15:
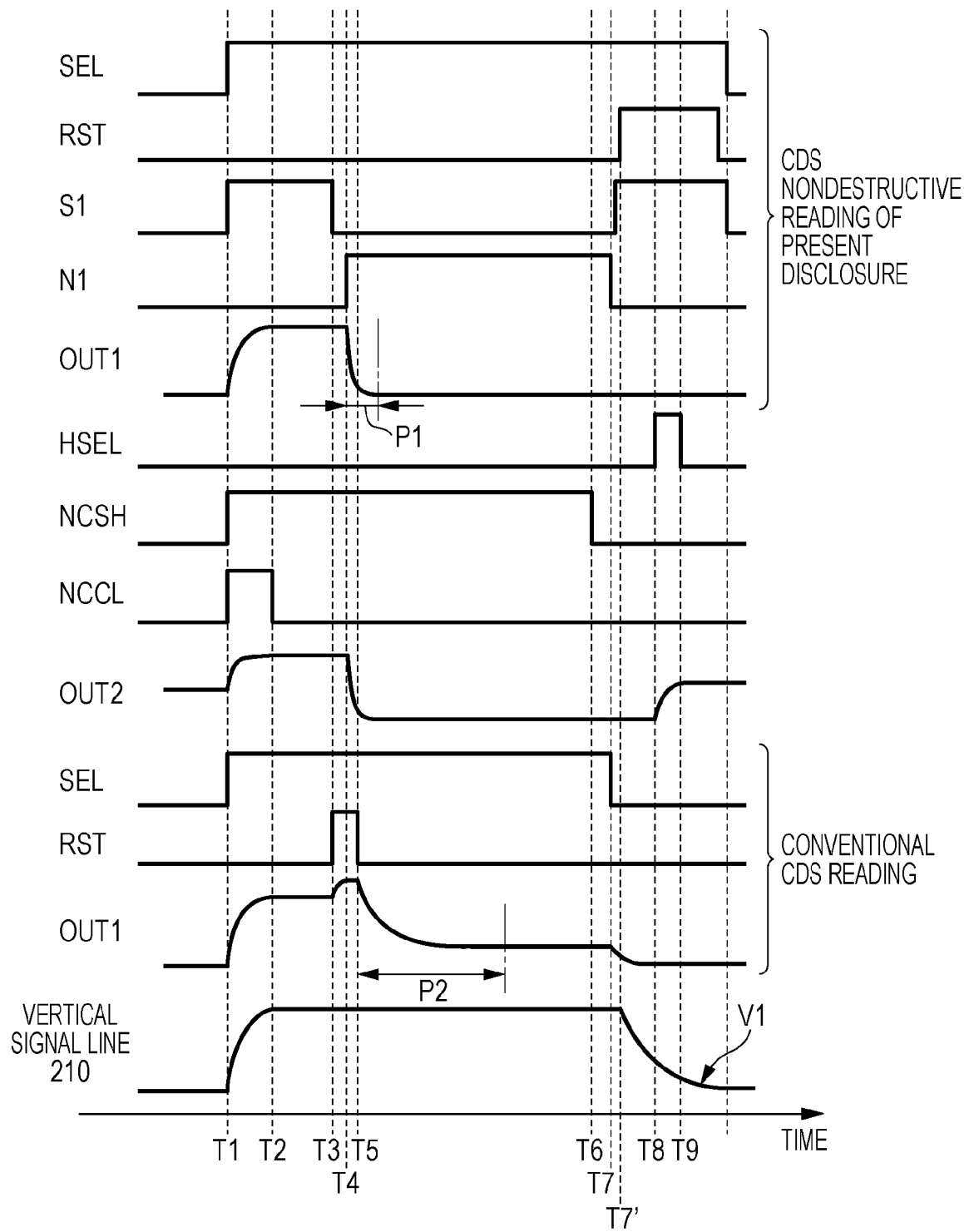
FIG. 15 is an operation timing chart for describing CDS processing for a pixel signal in each of the imaging device according to the fifth embodiment and a conventional imaging device.

FIG. 15 is an operation timing chart for describing CDS processing for a pixel signal in each of the imaging device according to the fifth embodiment and a conventional imaging device. The CDS nondestructive reading operation according to the present embodiment will be described below with reference to FIG. 15.

First, at a time T1, the vertical scanning section 30 changes a control signal SEL to a high level, thereby bringing a select transistor 104 to an ON state. At the same time, the control signal S1 as well as control signals NCSH and NCCL (shown in FIG. 4) supplied to the signal retention section 50 are each changed to a high level, so that the switch transistors 81 and 82 as well as transistors 53 and 52 (shown in FIG. 4) are each brought to an ON state. As a result, the potential of an input terminal OUT1 converges to a pixel signal voltage, and at the same time, the potential of a connection terminal OUT2 (shown in FIG. 4) is clamped (converges) to a reference voltage $V_{REF}$ (shown in FIG. 4).

Next, at a time T2, the control signal NCCL is changed to a low level, to bring the transistor 52 to an OFF state. As a result, the potential of the connection terminal OUT2 converges from the reference voltage $V_{REF}$ to the pixel signal voltage.

Next, at a time T3, the control signal S1 is changed to a low level, to bring each of the switch transistors 81 and 82 to an OFF state.

Next, at a time T4, the control signal N1 is changed to a high level, to bring the switch transistor 83 to an ON state. As a result, the negative input terminal and the output terminal of the inverting amplifier 96 are connected, so that the inverting amplifier 96 can operate as a voltage follower circuit. Therefore, the reset voltage V1 outputted from the reference-signal generation section 470 is transmitted to the positive input terminal of the inverting amplifier 96 via the reference signal line 296, so that the reset voltage V1 is transmitted to the input terminal OUT1 via the inverting amplifier 96. Here, in the reading operation according to the present embodiment, a period from the time when the switch transistor 82 is brought to the ON state until the potential of the input terminal OUT1 converges to the reset voltage V1 is a period P1. The period P1 depends on a time constant of the reference signal line 296 that transmits the reset voltage V1.

Therefore, it is possible to execute the CDS processing at the signal retention section 50 without resetting the potential of a charge storage section 105 of the pixel 110, and therefore, high-speed and high-accuracy nondestructive reading is achievable.

Next, at a time T6, the control signal NCSH is changed to a low level, to bring the transistor 53 to an OFF state. As a result, the potential of the connection terminal OUT2 converges to a differential voltage that is a difference between a pixel signal voltage and a reset signal voltage.

Next, at a time T8, the horizontal scanning section 40 changes a control signal HSEL to a high level, thereby bringing a transistor 54 to an ON state. As a result, a CDS pixel signal that is the above-described differential voltage is read out to a horizontal signal line 254.

Here, there will be described operation of setting the vertical signal line 210 at a reset signal V1 of the reference-signal generation section 370, in resetting the pixel 110. At a time T7' following a time T7, a control signal RST is changed to a high level, to bring the reset transistor 102 to an ON state. Further, the control signal S1 is changed to the high level to bring each of the switch transistors 81 and 82 to the ON state, and the control signal N1 is changed to a low level to bring the switch transistor 83 to an OFF state. The voltage of the negative input terminal connected to the vertical signal line 210 converges to the reset voltage V1 of the positive input terminal connected to the reference signal line 296, due to action of the inverting amplifier 95.

As a result, it is possible to set the vertical signal line 210 at the reset signal V1 of the reference-signal generation section 470, in resetting the pixel 110. In the present embodiment, due to the action of the inverting amplifier 96, the voltage of the negative input terminal connected to the vertical signal line 210 can accurately converge to a voltage equivalent to the reset voltage V1 of the positive input terminal connected to the reference signal line 296, without depending on variations in the transistors of the pixel section and variations in the current sources. In the present embodiment, it is possible to set the reset signal V1 at the negative input terminal of the inverting amplifier 96, both at the time of setting the reset signal V1 in resetting between the time T5 and the time T6, and at the time of setting the reset signal V1 in resetting the pixel section at the time T7'. Therefore, it is possible to eliminate an offset difference in the reset signal V1. In other words, when an input voltage from the vertical signal line represents no (a dark) signal, there is no difference from a reference voltage V1, and therefore, it is possible to provide an imaging device capable of performing high-speed nondestructive reading, without impairing a dynamic range.

Moreover, in resetting the pixel 110, although a period P2 is necessary for resetting a pixel, it is possible to perform driving without losing a high speed (a frame rate), by, for example, causing operation in the same period as a horizontal transfer period.

Sixth Embodiment

The imaging device according to each of the first to fifth embodiments can be applied to a digital-output-type image sensor.

Figure 16:
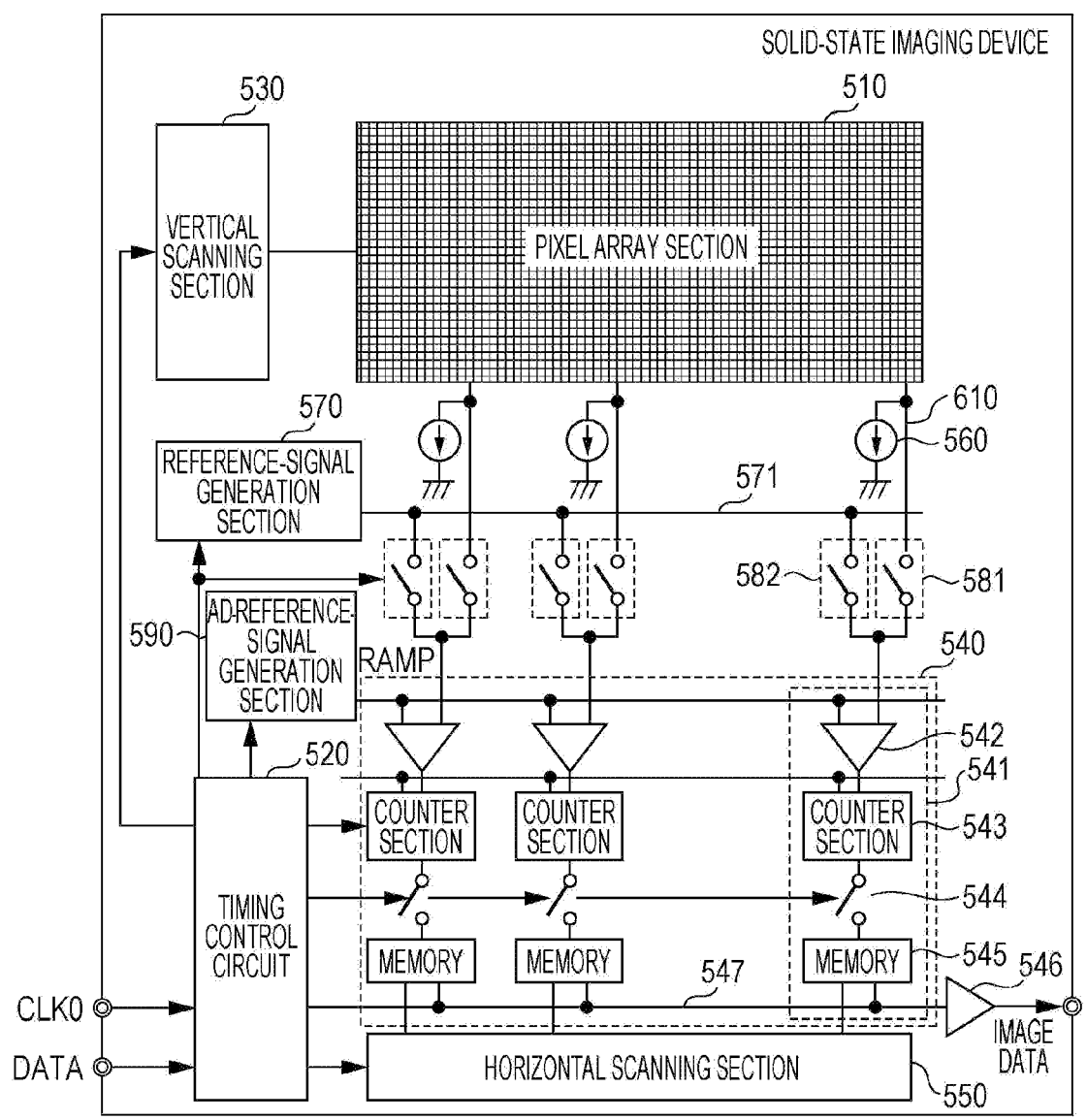
FIG. 16 is a block diagram illustrating an overall configuration of an imaging device according to a sixth embodiment.

FIG. 16 is a block diagram showing an overall configuration of an imaging device according to a sixth embodiment. An imaging device 4 shown in FIG. 16 is a digital-output-type image sensor, and includes a pixel array section 510, a vertical scanning section 530, a timing control circuit 520, an analog/digital (AD) converter circuit 540, a current source 560, a reference-signal generation section 570, a first switch section 581, a second switch section 582, an AD-reference-signal generation section 590, and an output interface (I/F) 546.

The pixel array section 510 has a configuration similar to that of the pixel array section 10 according to the first embodiment. Each pixel is connected to a scanning line controlled by the vertical scanning section 530, and to a vertical signal line 610 transmitting a pixel signal to the A/D converter circuit 540.

The timing control circuit 520 generates various internal clocks by receiving a master clock CLKO and data DATA via an external terminal, thereby controlling the vertical scanning section 530, the reference-signal generation section 570, the AD-reference-signal generation section 590, the first switch section 581, and the second switch section 582.

The AD-reference-signal generation section 590 supplies a reference voltage RAMP for AD conversion, to a column AD circuit 541 of the A/D converter circuit 540.

The A/D converter circuit 540 includes the column AD circuit 541 as each of column AD circuits 541 provided for the respective pixel columns. The column AD circuit 541 converts an analog voltage signal into a digital signal, by using the reference voltage RAMP generated in the AD-reference-signal generation section 590. This analog voltage signal is each of a pixel signal outputted from a pixel 100 and a reset signal outputted from the reference-signal generation section 570.

The column AD circuit 541 includes a voltage comparison section 542, a counter section 543, a switch 544, and a memory 545. The voltage comparison section 542 compares the analog pixel signal obtained from the pixel 100 via the vertical signal line 610, with the reference voltage RAMP. In addition, the voltage comparison section 542 compares the analog reset signal obtained from the reference-signal generation section 570 via a reference signal line 571, with the reference voltage RAMP. The memory 545 holds the time consumed up to completion of comparison processing by the voltage comparison section 542 and a result of counting performed using the counter section 543.

The reference voltage RAMP, which is a stepwise voltage generated in the AD-reference-signal generation section 590, is inputted to one of input terminals of the voltage comparison section 542, as a voltage common to input terminals of other voltage comparison sections 542. The pixel signal from the pixel 100 or the reset signal from the reference-signal generation section 570 is inputted to the other one of the input terminals of the voltage comparison section 542. An output signal of the voltage comparison section 542 is supplied to the counter section 543.

Simultaneously with the supply of the reference voltage RAMP to the voltage comparison section 542, the column AD circuit 541 starts counting with a clock signal, and continues the counting until obtaining a pulse signal by comparing the inputted analog voltage signal with the reference voltage RAMP, thereby performing the AD conversion.

The column AD circuit 541 also performs processing of determining a difference between a reset signal level (a noise level) and a pixel signal level, in addition to the AD conversion. A noise signal component can be thereby removed from a voltage signal.

The column AD circuit 541 is configured to extract only a true signal level by counting down the reset signal level, and counting up the pixel signal level. The signal digitized in the column AD circuit 541 is inputted to the output I/F 546 via a horizontal signal line 547.

In the imaging device 4 having the above-described configuration, a pixel signal is outputted to the A/D converter circuit 540 by a change of the first switch section 581 to a conduction state, and then a reset signal from the reference-signal generation section 570 is outputted to the A/D converter circuit 540 by a change of the second switch section 582 to a conduction state.

Therefore, it is possible to allow the signal retention section 50 to retain a reset signal corresponding to the reset signal of a pixel, without requiring the time to charge and discharge the vertical signal line 610 extending in a pixel-column direction and having a large capacity, by using a reset voltage $V_{RST}$.

In addition, a circuit configuration of the reference-signal generation section 570 and a circuit configuration of the pixel excluding a photoelectric conversion element are substantially identical. Therefore, a reset signal voltage outputted from the reference-signal generation section 570 can be substantially identical to a reset signal voltage outputted from the pixel by bringing a reset transistor 102 to an ON state. Accordingly, it is possible to execute CDS processing at the A/D converter circuit 540 without resetting the pixel, so that high-speed and high-accuracy nondestructive reading of a digital output signal can be performed.

Seventh Embodiment

In the imaging device according to each of the first to sixth embodiments, the configuration for executing the nondestructive CDS processing, including the reference-signal generation section, the current source, the switch section, and the signal retention section, is disposed around the effective pixel region where the pixels are disposed. Adding this configuration increases a chip size of the imaging device, and limits a finer pixel pitch that accompanies an increase in the number of pixels.

An imaging device according to a seventh embodiment downsizes the above-described configuration for executing the nondestructive CDS processing.

Figure 17:
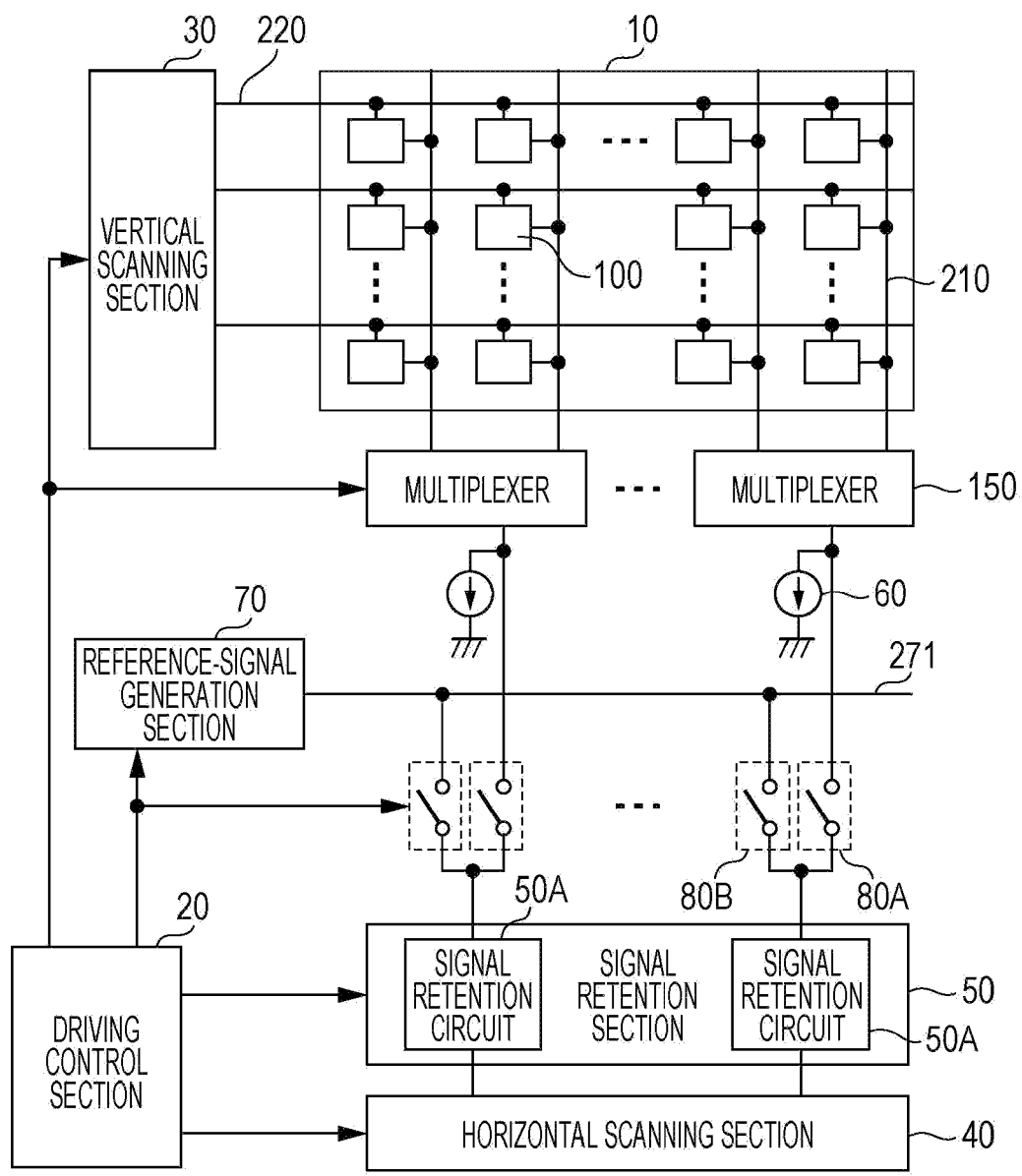
FIG. 17 is a block diagram illustrating an overall configuration of an imaging device according to a seventh embodiment.

FIG. 17 is a block diagram showing an overall configuration of the imaging device according to the seventh embodiment. An imaging device 5 shown in FIG. 17 includes a pixel array section 10, a driving control section 20, a vertical scanning section 30, a horizontal scanning section 40, a signal retention section 50, a current source 60, a reference-signal generation section 70, a first switch section 80A, a second switch section 80B, and a multiplexer 150. Further, in the pixel array section 10 and a peripheral region thereof, a vertical signal line 210 is disposed for each pixel column, and a scanning line 220 is disposed for each pixel row.

A configuration of the imaging device 5 according to the present embodiment is different from that of the imaging device 1 according to the first embodiment, in that the multiplexer 150 is provided. Description of points similar to those of the imaging device 1 according to the first embodiment will be omitted, and the difference will be mainly described below.

The multiplexer 150 has two input terminals and one output terminal, and is disposed for every two adjacent pixel columns. The two input terminals are connected to two adjacent vertical signal lines 210, respectively, and the output terminal is connected to the current source 60 and the first switch section 80A that are disposed for the every two adjacent pixel columns.

The reference-signal generation section 70 is connected to the second switch section 80B disposed for the above-described every two adjacent pixel columns.

The signal retention section 50 includes a signal retention circuit 50A disposed for the above-described every two adjacent pixel columns. An input terminal of the signal retention circuit 50A is connected to a connection point between the first switch section 80A and the second switch section 80B.

In the above-described configuration, the imaging device 5 performs, for example, the following operation.

First, the multiplexer 150 is caused to select connection with the vertical signal line 210 in every odd-numbered column.

Next, the first switch section 80A is caused to conduct, so that a pixel signal is outputted from a pixel 100 in an odd-numbered column to the signal retention circuit 50A.

Next, the second switch section 80B is caused to conduct, so that a reset signal is outputted from the reference-signal generation section 70 to the signal retention circuit 50A.

Next, the signal retention circuit 50A generates a CDS pixel signal of the odd-numbered pixel column from the pixel signal and the reset signal described above, and retains the generated CDS pixel signal.

Next, the multiplexer 150 is caused to select connection with the vertical signal line 210 in an even-numbered column.

Next, the first switch section 80A is caused to conduct, so that a pixel signal is outputted from the pixel 100 in the even-numbered column to the signal retention circuit 50A.

Next, the second switch section 80B is caused to conduct, so that a reset signal is outputted from the reference-signal generation section 70 to the signal retention circuit 50A.

Next, the signal retention circuit 50A generates a CDS pixel signal of the even-numbered pixel column from the pixel signal and the reset signal described above, and retains the generated CDS pixel signal.

The horizontal scanning section 40 reads the CDS pixel signal of the odd-numbered pixel column and the CDS pixel signal of the even-numbered pixel column, from the signal retention section 50.

According to the above-described configuration, to execute nondestructive CDS reading operation, the current source 60, the first switch section 80A, the second switch section 80B, and the signal retention circuit 50A may be disposed for every two pixel columns, not for each pixel column. Therefore, it is possible to reduce a circuit area provided around the pixel array section 10, so that the imaging device can be downsized.

The multiplexer 150 according to the present embodiment may be disposed on the vertical signal line 210, in the configuration in which the reference-signal generation circuit 170A is disposed for each pixel column as in the imaging device 2 according to the second embodiment. This can halve the number of the reference-signal generation circuits 170A to be disposed. In this case, likewise, it is possible to reduce a circuit area provided around the pixel array section 10, so that the imaging device can be downsized.

Moreover, the number of pixel columns selectable by the multiplexer 150 is not limited to two, and tree or more pixel columns may be connected depending on the signal retention capability of the signal retention circuit 50A.

(Effects)

According to the above-described embodiments of the present disclosure, the imaging device includes the pixel array section 10 that includes the pixels 100 arranged in rows and columns, the vertical signal line 210 that is provided for each pixel column, the signal retention section 50 that outputs a differential signal corresponding to a difference between a pixel signal outputted from each of the pixels 100 and a reset signal corresponding to a reset voltage of the pixels 100, the first switch section 80A that is connected between the vertical signal line 210 and the signal retention section 50 and switches between input and interruption of the pixel signal from each of the pixels 100 to the signal retention section 50, the reference-signal generation section 70 that generates the reset signal, and the second switch section 80B that is connected between the reference-signal generation section 70 and the signal retention section 50 and switches between input and interruption of the reset signal from the reference-signal generation section 70 to the signal retention section 50.

Therefore, it is possible to allow the signal retention section 50 to retain a reset signal corresponding to the reset signal of the pixel 100, without requiring the time to charge and discharge the vertical signal line 210 extending in a pixel-column direction and having a large capacity by using the reset voltage. Accordingly, high-speed nondestructive reading is allowed.

The imaging device may further include the driving control section 20 that causes the signal retention section 50 to retain the pixel signal by bringing the first switch section 80A to a conduction state and the second switch section 80B to a non-conduction state, and may allow input of the reset signal to the signal retention section 50 by bringing the first switch section 80A to a non-conduction state and the second switch section 80B to a conduction state in a state where the pixel signal is retained by the signal retention section 50, thereby allowing the signal retention section 50 to retain the differential signal.

Therefore, it is possible to execute the CDS processing at the signal retention section 50 without resetting the potential of the charge storage section 105 of the pixel 110, and therefore, high-speed and high-accuracy nondestructive reading is achievable.

Further, the pixels 100 may each include the photoelectric conversion element 101 that performs photoelectric conversion of incident light into signal charge, the charge storage section 105 that is connected to the photoelectric conversion element 101 and stores the signal charge, the amplification transistor 103 that includes the gate being connected to the charge storage section 105 and the drain being supplied with a power supply voltage and outputs a pixel signal corresponding to an amount of the signal charge, the reset transistor 102 that includes the drain being supplied with a reset voltage and the source being connected to the charge storage section 105 and resets the potential of the charge storage section 105, and the select transistor 104 that includes the drain being connected to the source of the amplification transistor 103 and the source being connected to the vertical signal line 210 and selectively outputs the pixel signal from the amplification transistor 103, and the reference-signal generation section 70 includes the transistor 73 that includes the drain being supplied with the power supply voltage, and the transistor 74 that includes the drain being connected to the source of the transistor 73 and the source being connected to the second switch section 80B.

Furthermore, the transistor 73 may have an electric characteristic substantially identical to an electric characteristic of the amplification transistor 103, and the transistor 74 may have an electric characteristic substantially identical to an electric characteristic of the select transistor 104.

The reference-signal generation section 70 may further include the transistor 72 that includes the drain being supplied with the reset voltage, and the source being connected to the gate of the transistor 73.

Further, the transistor 72 may have an electric characteristic substantially identical to an electric characteristic of the reset transistor 102.

Therefore, the circuit configuration of the reference-signal generation section 70 and the circuit configuration of the pixel 100 excluding the photoelectric conversion element 101 can be substantially identical. In other words, the circuit configuration of the reference-signal generation section 70 is a replica of the source follower circuit in the pixel 100. Accordingly, a reset signal voltage outputted from the reference-signal generation section 70 can be substantially identical with a reset signal voltage outputted from the pixel 100 upon turning on of the reset transistor 102. Hence, it is possible to execute the CDS processing at the signal retention section 50 without resetting the potential of the charge storage section 105 of the pixel 100, and therefore, high-speed and high-accuracy nondestructive reading is achievable.

One terminal of the first switch section 80A may be connected to the vertical signal line 210, and one terminal of the second switch section 80B may be connected to the source of the transistor 74, and the imaging device may further include the current source transistor 62 that includes the drain being connected to the other terminal of the first switch section 80A and the other terminal of the second switch section 80B, and the source being grounded.

Therefore, the current source transistor 62 serves as a current source in outputting a pixel signal of the pixel 100 when the first switch section 80A is in the conduction state, and serves as a current source in outputting a reset signal of the reference-signal generation section when the second switch section 80B is in the conduction state. Accordingly, it is possible to reduce the current source transistors in the reference-signal generation section and therefore, it is easy to reduce the area of the reference-signal generation section.

Further, the pixels 100 may form the effective pixel region where the pixels 100 each generate a pixel signal by receiving incident light, in the pixel array section 10, and the reference-signal generation section 170 may be disposed in the first peripheral region next to the effective pixel region in the column direction.

When the reference-signal generation section 170 is thus disposed in the first peripheral region provided next to the effective pixel region, the reference-signal generation circuit 170A and the pixel 100 can be closely similar to each other in terms of structure. Therefore, a reset signal outputted from the reference-signal generation circuit 170A and a reset signal outputted from the pixel 100 can be matched with each other with high accuracy, so that higher-accuracy nondestructive CDS operation is realized.

In addition, since the reference-signal generation circuit 170A can be disposed for each pixel column, it is possible to reduce the distance between the reference-signal generation section 170 and the second switch section 80B, and it is also possible to distribute a power load of the reference-signal generation section 170 among the reference-signal generation circuits 170A. Accordingly, it is possible to suppress a fluctuation of a reset signal outputted from the reference-signal generation section 170 due to a factor independent of the pixel 100, so that a high-precision reset signal can be supplied to the signal retention section 50.

Furthermore, the pixels 100 may form the effective pixel region where the pixels 100 each generate a pixel signal by receiving incident light, in the pixel array 10, and the reference-signal generation section 270 may be disposed in the third peripheral region next to both of the first peripheral region next to the effective pixel region in the column direction, and the second peripheral region next to the effective pixel region in the row direction.

Therefore, the reference-signal generation section 270 and the pixel 100 can be closely similar to each other in terms of structure. Accordingly, a reset signal outputted from the reference-signal generation section 270 and a reset signal outputted from the pixel 100 can be matched with each other with high accuracy, so that higher-accuracy nondestructive CDS operation is realized.

Furthermore, in the reference-signal generation section 270A, the buffer amplifier 91 may be inserted between an output terminal for the reset signal and the second switch section 80B.

Therefore, a reset signal voltage on the input side of the buffer amplifier 91 is stably transmitted to the reference signal line 271 on the output side, even if there is a load fluctuation. Accordingly, the capability of driving a reset signal increases even if the number of reference-signal generation circuits included in the reference-signal generation section 270A is small, and therefore, the signal retention section 50 can be supplied with a high-accuracy reset signal unaffected by a load fluctuation.

Further, the pixels 110 each include the photoelectric conversion element 101 that performs photoelectric conversion of incident light into signal charge, the charge storage section 105 that is connected to the photoelectric conversion element 101 and stores the signal charge, the amplification transistor 103 that includes the gate being connected to the charge storage section 105 and the drain being supplied with a power supply voltage and outputs a pixel signal corresponding to an amount of the signal charge, the reset transistor 102 that includes the source being connected to the charge storage section 105 and resets the potential of the charge storage section 105, and the select transistor 104 that includes the drain being connected to the source of the amplification transistor 103 and the source being connected to the vertical signal line 210 and selectively outputs the pixel signal from the amplification transistor 103, the reference-signal generation section 370 includes the transistor 73 that includes the drain being supplied with the power supply voltage, the transistor 74 that includes the drain being connected to the source of the transistor 73 and the source being connected to the second switch section 80B, and the inverting amplifier 95 that includes the first input terminal, the second input terminal, and the output terminal, the first input terminal is connected to the vertical signal line 210 and the first switch section 80A, the second input terminal is connected to the second switch section 80B and receives the reset voltage V1 that is the reset signal, and the output terminal is connected to the drain of the reset transistor 102.

Therefore, it is possible to execute the CDS processing at the signal retention section 50 without resetting the potential of the charge storage section 105 of the pixel 110, and thus, high-speed and high-accuracy nondestructive reading is achievable. In addition, it is possible to set the vertical signal line 210 at the reset signal V1 of the reference-signal generation section 370, in resetting the pixel 110. Due to the action of the inverting amplifier 95, the voltage of the negative input terminal connected to the vertical signal line 210 can accurately converge to a voltage equivalent to the reset voltage V1 of the positive input terminal connected to the reference signal line 295, without depending on variations in the transistors of the pixel 110 and variations in the current sources. In other words, when an input voltage from the vertical signal line 210 represents no (a dark) signal, there is no difference from the reference voltage V1, and therefore, it is possible to provide an imaging device capable of performing high-speed nondestructive reading, without impairing a dynamic range.

Furthermore, the pixels 110 each include the photoelectric conversion element 101 that performs photoelectric conversion of incident light into signal charge, the charge storage section 105 that is connected to the photoelectric conversion element 101 and stores the signal charge, the amplification transistor 103 that includes the gate being connected to the charge storage section 105 and the drain being supplied with a power supply voltage and outputs a pixel signal corresponding to an amount of the signal charge, the reset transistor 102 that includes the source being connected to the charge storage section 105 and resets the potential of the charge storage section 105, and the select transistor 104 that includes the drain being connected to the source of the amplification transistor 103 and the source being connected to the vertical signal line 210 and selectively outputs the pixel signal from the amplification transistor 103, the first switch section 80A includes the switch transistor 81 and the switch transistor 82, the reference-signal generation section 470 includes the transistor 73 that includes the drain being supplied with the power supply voltage, the transistor 74 that includes the drain being connected to the source of the transistor 73, and the inverting amplifier 96 that includes the first input terminal, the second input terminal, and the output terminal, the switch transistor 81 includes the drain being connected to the drain of the reset transistor 102, the switch transistor 82 includes the drain being connected to the vertical signal line 210, the first input terminal is connected to the source of the switch transistor 82 and one end of the second switch section 80B, the second input terminal receives a reset voltage that is the reset signal, and the output terminal is connected to the source of the switch transistor 81 as well as the other end of the second switch section 80B.

Therefore, it is possible to execute the CDS processing at the signal retention section 50 without resetting the potential of the charge storage section 105 of the pixel 101, and thus, high-speed and high-accuracy nondestructive reading is achievable. In addition, it is possible to set the vertical signal line 210 at the reset signal V1 of the reference-signal generation section 470, in resetting the pixel 110. Due to the action of the inverting amplifier 96, the voltage of the negative input terminal connected to the vertical signal line 210 can accurately converge to a voltage equivalent to the reset voltage V1 of the positive input terminal connected to the reference signal line 296, without depending on variations in the transistors of the pixel 110 and variations in the current sources. Moreover, it is possible to eliminate an offset difference in the reset signals V1. In other words, when an input voltage from the vertical signal line 210 represents no (a dark) signal, there is no difference from the reference voltage V1, and therefore, it is possible to provide an imaging device capable of performing high-speed nondestructive reading, without impairing a dynamic range.

The imaging device may further include the multiplexer 150 that is disposed between the vertical signal lines 210 and the first switch section 80A, and selectively switches connection between one of the vertical signal lines 210 to the first switch section 80A, and the first switch section 80A and the second switch section 80B may be each disposed corresponding to the multiplexer 150.

Therefore, to execute the nondestructive CDS reading operation, the current source 60, the first switch section 80A, the second switch section 80B, and the signal retention circuit 50A may not be disposed for each pixel column, and may be disposed for every two or more pixel columns. Accordingly, it is possible to reduce the circuit area provided around the pixel array section 10, so that the imaging device can be downsized.

Other Embodiments

The imaging devices according to the first to seventh embodiments of the present disclosure have been described, but the present disclosure is not limited to the first to seventh embodiments. Various modifications conceived by a person skilled in the art without departing from the gist of the present disclosure are also included in the scope of the present disclosure. Further, any components in two or more of the embodiments may be freely combined without departing from the gist of the present disclosure.

The imaging device according to each of the embodiments described above is typically implemented as a large scale integration (LSI) that is an integrated circuit. These imaging devices may be each integrated into one chip, and may be each integrated partially or entirely into one chip.

The integrated circuit is not limited to LSI, and may be implemented by an exclusive circuit or a general-purpose processor. A field programmable gate array (FPGA) capable of being programmed after LSI manufacturing, or a reconfigurable processor capable of reconfiguring connection and setting for circuit cells in an LSI may be used.

Further, at least some of the functions of the imaging devices according to the embodiments described above may be combined.

The numbers used above are each taken as an example for specifically describing the present disclosure, and the present disclosure is not limited to these numbers.

In each of the embodiments described above, having the select transistor 104 and the transistor 74 is taken as an example. However, a pixel configuration without having the select transistor 104 and the transistor 74 may be used, for example, by performing pulse driving of the power supply of the amplification transistor 103 and the transistor 73.

In each of the embodiments described above, using an Nch-type metal oxide semiconductor (MOS) transistor is taken as an example. However, a Pch-type transistor may be used.

Further, in the above description, using the MOS transistor is taken as an example, but other type of transistor may be used.

In each of the embodiments described above, performing the operation of resetting the signal retention section 50 after retaining a pixel signal is taken as an example. However, the pixel signal may be retained after the signal retention section 50 is reset. Including such a modification, various modifications conceived by a person skilled in the art without departing from the gist of the present disclosure are also included in the scope of the present disclosure.

Furthermore, various modifications conceived by a person skilled in the art based on the present embodiments are also included in the scope of the present disclosure, as long as these modifications do not depart from the gist of the present disclosure.

The imaging devices of the present disclosure is capable of performing high-speed nondestructive reading, and applicable to a digital still camera, a video camera, a vehicle-mounted camera, a surveillance camera, a medical camera, and the like.

What is claimed is:

1. An imaging device comprising:
   a pixel array that includes pixels arranged in rows and columns, each of the pixels outputting a pixel signal;
   vertical signal lines each of which is provided for each of the columns;
   a reference-signal generator that generates a reset signal corresponding to a reset voltage of the pixels;
   a signal processor that outputs a differential signal corresponding to a difference between the pixel signal and the reset signal;
   a first switch that is connected between one of the vertical signal lines and the signal processor, the first switch switching between input and interruption of the pixel signal from each of the pixels to the signal processor; and
   a second switch that is connected between the reference-signal generator and the signal processor, the second switch switching between input and interruption of the reset signal from the reference-signal generator to the signal processor.

2. The imaging device according to claim 1, further comprising:
   a driving controller that
   causes the pixel signal to be inputted into the signal processor by causing the first switch to be in a conduction state and the second switch to be in a non-conduction state,
   causes the signal processor to retain the pixel signal,
   causes the reset signal to be inputted into the signal processor by causing the first switch to be in a non-conduction state and the second switch to be in a conduction state, in a state where the signal processor retains the pixel signal, and
   causes the signal processor to retain the differential signal.

3. The imaging device according to claim 1, wherein each of the pixels includes
   a photoelectric converter that converts incident light into signal charge,
   a charge storage node that is connected to the photoelectric converter, the charge storage node storing the signal charge,
   an amplification transistor that includes a first gate, a first source, and a first drain, the first gate being connected to the charge storage node, and one of the first source and the first drain being supplied with a power supply voltage, the amplification transistor outputting the pixel signal corresponding to an amount of the signal charge,
   a reset transistor that includes a second gate, a second source, and a second drain, one of the second source and the second drain being supplied with a reset voltage, the other of the second source and the second drain being connected to the charge storage node, the reset transistor resetting a potential of the charge storage node, and
   a select transistor that includes a third gate, a third source, and a third drain, one of the third source and the third drain being connected to the other of the first source and the first drain, the other of the third source and the third drain being connected to the one of the vertical signal lines, the select transistor selectively outputting the pixel signal from the amplification transistor, and
   the reference-signal generator includes
   a first transistor that includes a fourth gate, a fourth source, and a fourth drain, one of the fourth source and the fourth drain being supplied with the power supply voltage, and
   a second transistor that includes a fifth gate, a fifth source, and a fifth drain, one of the fifth source and the fifth drain being connected to the other of the fourth source and the fourth drain, the other of the fifth source and the fifth drain being connected to the second switch.

4. The imaging device according to claim 3, wherein
   the first transistor has an electric characteristic substantially identical to an electric characteristic of the amplification transistor, and
   the second transistor has an electric characteristic substantially identical to an electric characteristic of the select transistor.

5. The imaging device according to claim 3, wherein
   the reference-signal generator further includes
   a third transistor that includes a sixth gate, a sixth source, and a sixth drain, one of the sixth source and the sixth drain being supplied with the reset voltage, the other of the sixth source and the sixth drain being connected to the fourth gate.

6. The imaging device according to claim 5, wherein
   the third transistor has an electric characteristic substantially identical to an electric characteristic of the reset transistor.

7. The imaging device according to claim 3, further comprising:
   a current source transistor that includes a seventh gate, a seventh source, and a seventh drain, one of the seventh source and the seventh drain being connected to one terminal of the first switch and one terminal of the second switch, the other of the seventh source and the seventh drain being grounded, wherein
   the other terminal of the first switch is connected to the one of the vertical signal lines, and
   the other terminal of the second switch is connected to the other of the fifth source and the fifth drain.

8. The imaging device according to claim 1, wherein
   the pixels form an effective pixel region where each of the pixels generates a pixel signal by receiving incident light, in the pixel array, and
   the reference-signal generator is located in a first peripheral region adjacent to the effective pixel region in a column direction.

9. The imaging device according to claim 1, wherein
the pixels form an effective pixel region where each of the pixels generates a pixel signal by receiving incident light, in the pixel array, and
the reference-signal generator is located in a third peripheral region adjacent to both of a first peripheral region and a second peripheral region, the first peripheral region being adjacent to the effective pixel region in a column direction, the second peripheral region being adjacent to the effective pixel region in a row direction.

10. The imaging device according to claim 9, wherein the reference-signal generator includes a buffer circuit, the reset signal being outputted via the buffer circuit.

11. The imaging device according to claim 1, wherein each of the pixels includes
a photoelectric converter that converts incident light into signal charge,
a charge storage node that is connected to the photoelectric converter, the charge storage node storing the signal charge,
an amplification transistor that includes a first gate, a first source, and a first drain, the first gate being connected to the charge storage node, one of the first source and the first drain being supplied with a power supply voltage, the amplification transistor outputting a pixel signal corresponding to an amount of the signal charge,
a reset transistor that includes a second gate, a second source, and a second drain, one of the second source and the second drain being connected to the charge storage node, the reset transistor resetting a potential of the charge storage node, and
a select transistor that includes a third gate, a third source, and a third drain, one of the third source and the third drain being connected to the other of the first source and the first drain, the other of the third source and the third drain being connected to the one of the vertical signal lines, the select transistor selectively outputting the pixel signal from the amplification transistor, and
the reference-signal generator includes
a first transistor that includes a fourth gate, a fourth source, and a fourth drain, one of the fourth source and the fourth drain being supplied with the power supply voltage,
a second transistor that includes a fifth gate, a fifth source, and a fifth drain, one of the fifth source and the fifth drain being connected to the other of the fourth source and the fourth drain, the other of the fifth source and the fifth drain being connected to the second switch, and
a buffer amplifier that includes a first input terminal, a second input terminal, and an output terminal, the first input terminal being connected to the first switch and the one of the vertical signal lines, the second input terminal being connected to the second switch and receiving a reset voltage that is the reset signal, the output terminal being connected to the other of the second source and the second drain.

12. The imaging device according to claim 1, wherein the pixels each include
a photoelectric converter that converts incident light into signal charge,
a charge storage node that is connected to the photoelectric converter, the charge storage node storing the signal charge,
an amplification transistor that includes a first gate, a first source, and a first drain, the first gate being connected to the charge storage node, and one of the first source and the first drain being supplied with a power supply voltage, the amplification transistor outputting a pixel signal corresponding to an amount of the signal charge,
a reset transistor that includes a second gate, a second source, and a second drain, one of the second source and the second drain being connected to the charge storage node, reset transistor resetting a potential of the charge storage node, and
a select transistor that includes a third gate, a third source, and a third drain, one of the third source and the third drain being connected to the other of the first source and the first drain, and the other of the third source and the third drain being connected to the one of the vertical signal lines, the select transistor selectively outputting the pixel signal from the amplification transistor,
the first switch includes
a first switch transistor that includes an eighth gate, an eighth source, and an eighth drain, one of the eighth source and the eighth drain being connected to the other of the second source and the second drain, and
a second switch transistor that includes a ninth gate, a ninth source, and a ninth drain, one of the ninth source and the ninth drain being connected to the one of the vertical signal lines, and
the reference-signal generator includes
a first transistor that includes a fourth gate, a fourth source, and a fourth drain, one of the fourth source and the fourth drain being supplied with the power supply voltage,
a second transistor that includes a fifth gate, a fifth source, and a fifth drain, one of the fifth source and the fifth drain being connected to the other of the fourth source and the fourth drain, and
a buffer amplifier that includes a first input terminal, a second input terminal, and an output terminal, the first input terminal being connected to the other of the ninth source and the ninth drain and one end of the second switch, the second input terminal receiving a reset voltage that is the reset signal, the output terminal being connected to the other of the eighth source and the eighth drain as well as the other end of the second switch.

13. The imaging device according to claim 1, further comprising:
a multiplexer that is located between a plurality of the vertical signal lines and the first switch, the multiplexer selectively switching connection between each of the plurality of the vertical signal lines and the first switch,
wherein each of the first switch and the second switch is located corresponding to the multiplexer.

14. An imaging device comprising:
a pixel array that includes pixels arranged in rows and columns, each of the pixels outputs a pixel signal;
vertical signal lines each of which is provided for each of the columns, each of the vertical signal lines transmitting the pixel signal;
a reference-signal generator that generates a reset signal corresponding to a reset voltage of the pixels;
a wiring that is connected to the reference-signal generator, the wiring transmitting the reset signal; and
a signal processor that outputs a differential signal corresponding to a difference between the pixel signal inputted via one of the vertical signal line and the reset signal inputted via the wiring, wherein the wiring is insulated from the one of the vertical signal line when the reset signal is inputted into the signal processor via the wiring.

15. An imaging device comprising:

a pixel array that includes pixels arranged in rows and columns, each of the pixels outputs a pixel signal;

vertical signal lines each of which is provided for each of the columns, each of the vertical signal lines transmitting the pixel signal;

a reference-signal generator that generates a reset signal corresponding to a reset voltage of the pixels; and a signal processor that outputs a differential signal corresponding to a difference between the pixel signal inputted via one of the vertical signal lines and the reset signal, wherein the reset signal is inputted into the reference-signal generator in a path separated from the one of the vertical signal line.

* * * * *